Figure 1:

United States Patent [19]

Riman et al.

[11] Patent Number: 5,252,311

[45] Date of Patent: Oct. 12, 1993

[54] PHASE STABLE LEAD MONOXIDE AND PROCESS FOR THE PRODUCTION THEREOF

[76] Inventors: Richard E. Riman, 13 Whitehall Rd., East Brunswick, N.J. 08816; Michael J. Munson, 2100 E. Highway 31, Apartment 306, Athens, Tex. 75751

[21] Appl. No.: 833,565

[22] Filed: Feb. 7, 1992

Related U.S. Application Data

[63] Continuation of Ser. No. 512,243, Apr. 20, 1990, abandoned.

[51] Int. Cl.$^5$ ............................................. C01G 21/06
[52] U.S. Cl. ....................................... 423/619; 252/25
[58] Field of Search ....................... 423/619; 106/432; 252/25

[56] References Cited

U.S. PATENT DOCUMENTS

| | | | |
|---|---|---|---|
| 3,347,650 | 10/1967 | Barkhau | 65/26 |
| 3,497,376 | 2/1970 | Weiser | 427/470 |
| 3,497,382 | 2/1970 | Kwestroo et al. | 423/613 |
| 3,702,822 | 11/1972 | Hansen | 252/37 |
| 4,117,104 | 9/1978 | Sugahara et al. | 423/619 |
| 4,965,001 | 10/1990 | King | 252/25 |

FOREIGN PATENT DOCUMENTS

| | | | |
|---|---|---|---|
| 1092589 | 11/1960 | Fed. Rep. of Germany | |
| 2157834 | 5/1973 | Fed. Rep. of Germany | |
| 45-40164 | 12/1970 | Japan | 423/619 |
| 51-55757 | 5/1976 | Japan | |
| 53-22805 | 3/1978 | Japan | |
| 730795 | 4/1980 | U.S.S.R. | |

OTHER PUBLICATIONS

Zhang et al., "Natural Transformation from Marricot ($\beta$-PbO) to Litharge ($\alpha$-PbO)", Chemical Abstract, vol. 96, No. 20, 165756w, 1982.
Rhodes, W. H., 1981, J. Am. Ceram. Soc., 64(1): 13–19.
Tremper, R. T. & Gordon, R. E., 1978, In: "Agglomeration effects on the sintering of alumina powders prepared by autoclaving aluminum metal"; Ceramic Processing Before Firing, Onoda, G. Y. & Hench, L. L. (Eds.), John Wiley & Sons, New York, pp. 153–175.
Sordelet, D. J. & Akino, M. K., 1988, J. Am. Ceram. Soc., 71(12): 1148–1153.
Lange, F. F., Miller, K. T. 1987, J. Am. Ceram. Soc. 70(12): 896–900.
Johnson, D. W. & Schnettler, F. J., 1970, J. A. Ceram. Soc., 53(8): 440–444.
Hirayama, T., 1987, J. Am. Ceram. Soc. 70(6): C122–C124.
Brown, H. E., 1985, in "Lead Oxide Properties and Applications," First Edition, International Lead Zinc Research Organization, Inc., New York, N.Y. Ch. 3 & 5.
Senna, M. & Kuno, H. J., 1961, J. A. Ceram. Soc. 54(5): 259–262.
Morales et al., 1983, J. Mater. Sci., 18: 2117–2125.
Petersen, M., 1941, J. Am. Chem. Soc., 63: 2617–2620.
Kiparisov, S. et al., 1976, Izvestiya Akademii Nauk SSSR, Neorganicheskie Materialy, 12(5): 891–895.
White, W. B., et al., 1961, J. Am. Ceram. Soc., 44(4): 170–174.
Clarke, J. R. & Green, J. E., 1980, Thin Solid Films, 66: 339–349.

(List continued on next page.)

Primary Examiner—Gary P. Straub
Assistant Examiner—N. M. Nguyen
Attorney, Agent, or Firm—Pennie & Edmonds

[57] ABSTRACT

Phase stable lead monoxide powders are disclosed in which substantially pure free flowing PbO having a crystal phase which is homogeneous, and which phase may be selected from either the litharge or massicot forms, retains such phase homogeneity over extended periods under ambient storage conditions or even under the influence of ultraviolet light. Furthermore, lead monoxide powders and their oxalate precursors whose particles have a plate-like morphology and size which make them ideal for numerous applications are described. These and other compositions, as well as methods for making and utilizing these novel preparations, are included.

26 Claims, 11 Drawing Sheets

OTHER PUBLICATIONS

Sorrell, C. A., 1972, J. Am. Ceram. Soc., 44(1): 47–49.
Clark, G. L. & Rowan, R., 1941, J. Am. Chem. Soc. 63(5): 1302–1304.
Lewis et al., 1969, J. Appl. Cryst., 2: 156–164.
Soderquist, R. & Dickens, B., 1967, J. Phys. Chem. Solids 28: 823–827.
Phelps, G. W., 1947, Ceramic Age, September Issue, 158–161.
Reed, J. S., 1988, in "Introduction to the Principles of Ceramic Processing," (John-Wiley & Sons, New York, N.Y. pp. 355–378).
Norton, F. H., 1987, in "Fine Ceramics Technology and Applications," Robert E. Krieger Publishing Company, Inc., Malabar, Fla., pp. 133–148.
Keezer, R., et al, 1968, J. Applied Phys. 39(4): 2062–2066.
Fegley, B., et al., 1984, J. Am. Ceram. Soc., 67(60): C113–C116.
Komarneni, S., et al., 1988, J. Am. Ceram. Soc. 1988, 71(1): C26–C28.
deLau, J. G. M. 1970, Am. Ceram. Soc. Bull., 49(6): 572–574.
Johnson, D. W., et al., 1974, Am. Ceram. Soc. Bull., 53(20): 163–167.
Rice, G. W., 1987, J. Am. Ceram. Soc. 1987, 70(5): C117–C120.
Lee, M. H. et al., 1987, J. Am. Ceram. Soc. 70(2): C35–C36.
Brown, R. A. 1965, Am. Ceram. Soc. Bull., 44(6): 483–487.
Jordan, G. W. & Bernard, M. F., 1985, Ceram. Int., 11(6): 6 pages.
Rasmussen, M. D., et al., 1985, Ceram. Int., 11(2): 51–52.
LaMer, V. K., et al., 1950, J. Am. Chem. Soc., 72(11): 4847–4854.
Blendell, J. E., et al., 1984, Am. Ceram. Soc. Bull., 63(6): 797–802.
Sordelet, D. & Akinc, M., 1988, J. Coll. Int. Sci., 122(1): 47–59.
Aiken, D. et al., 1988, J. Am. Ceram. Soc., 71(10): 845–853.
Gordon, L. et al., 1959, in "Precipitation from Homogeneous Solution," (John Wiley & Sons, New York, N.Y.) pp. 61–62.
Kolthoff, et al., 1942, J. Phys. Chem., 46: 56–170.
Yankwich, P. E. & Copeland, J. L., 1957, J. Am. Chem. Soc., 79: 2081–2086.
Hedstrom, H. et al., 1977, J. Inorg. Nucl. Chem., 39: 1191–1194.
Ciftcioglu, M. et al., 1987, J. Am. Ceram. Soc. 70(11): C329–C334.
Bircumshaw & Harris, 1948, J. Chem. Soc. pp. 1898–1902.
Dollimore, D. et al., 1963, J. Chem. Soc. pp. 2617–2623.
Strizhkov, B. V. et al., 1962, Russ. J. Inorg. Chem. 7(10): 1220–1223.
Morsi, S. E., 1970, U'A.R.J. Chem. 13(1): 113–120.
Schwartz, S. L. et al., 1984, J. Am. Ceram. Soc., 67(5): 311–315.
Halliyal, A. et al., 1987, J. Am. Ceram. Soc., 70(20): 119–124.
Bacherikova, I. et al., 1975, Neftekhimiya 15(95): 750–755.
Denisyuk, A. et al., 1978, Friz. Goreniya Vzryva, 14(6): 29–36.
Blazejewski, et al., Chem. Abstr., 83: 78614m.
Gurney, F. et al., 1974, Tech Paper, Soc. Mfg. Eng., MF74-627, pp. 1–16.
Miyakawa, Y. et al., 1974, Junkastsu 15910: 657–672.
Miyakawa, Y. et al. 1970, Junkatsu 15(8): 469–477.
Miyakawa, Y. et al., 1970, Junkatsu 15(7): 391–406.
Peterson, M. & Johnson, R., 1957, J. Am. Soc. Lubr. Eng., 13: 203–207.
Zhang, R. I. et al., 1981, Chem. Abstr., 96: 165756w.
Nordyke, J. S. 1984, in "Lead in the World of Ceramics," The American Chemical Society, Columbus, Oh., p. 5

FIG. I

PHASE STABLE LEAD MONOXIDE AND PROCESS FOR THE PRODUCTION THEREOF

This is a continuation of application Ser. No. 07/512,243 filed Apr. 20, 1990 abandoned.

TABLE OF CONTENTS

1. FIELD OF THE INVENTION
2. BACKGROUND OF THE INVENTION
   2.1 POLYMORPHS OF LEAD MONOXIDE (PbO)
      2.1.1. EFFECT OF WATER ON LEAD MONOXIDE PHASE TRANSFORMATION
      2.1.2. EFFECT OF GRINDING ON LEAD MONOXIDE PHASE TRANSFORMATION
      2.1.3. STUDIES OF LEAD MONOXIDE PHASE TRANSFORMATION UNDER VACUUM
      2.1.4. FORMATION OF MASSICOT FROM SOLUTION
   2.2. PLASTICITY OF CERAMIC PRECURSOR MATERIALS
   2.3. PREPARATION OF CERAMIC POWDERS
      2.3.1. CHEMICAL SYNTHESIS ROUTES
      2.3.2. POWDER PRECIPITATION
         2.3.2.1. DIRECT STRIKE PRECIPITATION
         2.3.2.2. PRECIPITATION FROM HOMOGENEOUS SOLUTION (PFHS)
      2.3.3. TECHNIQUES FOR PRECIPITATION OF OXALATE PRECURSORS
         2.3.3.1. LEAD OXALATE SYNTHESIS
   2.4. PRECURSOR POWDER CALCINATION
      2.4.1. FORMATION OF HARD AND SOFT AGGLOMERATES DURING CALCINATION
      2.4.2. CALCINATION OF LEAD OXALATES
   2.5 LEAD MONOXIDE APPLICATIONS
3. DEFINITIONS
4. SUMMARY OF THE INVENTION
5. BRIEF DESCRIPTION OF THE FIGURES
6. DETAILED DESCRIPTION OF THE INVENTION
   6.1. OXALATE POWDER PRECIPITATION
   6.2. PRECURSOR POWDER CHARACTERIZATION
   6.3. RESULTS OF OXALATE PRECIPITATION
   6.4. OXALATE POWDER CALCINATION
   6.5. CHARACTERIZATION OF THE PbO PHASE TRANSFORMATION
   6.6. RESULTS OF TGA AND DTA ANALYSES OF THE PRECURSOR OXALATES
   6.7. CHARACTERIZATION OF THE OXIDES
   6.8. EFFECT OF THE PbO PHASE TRANSFORMATION ON PARTICLE AGGREGATION
   6.9. PHASE STABILITY OF THE PbO POWDERS
   6.10. COMPOSITIONS HAVING PLASTICITY
7. EXAMPLES
   7.1. PREPARATION OF METAL OXALATE PRECURSORS
   7.2. CALCINATION TO LEAD OXIDE POWDERS
   7.3. PREPARATION OF WORKABLE COMPOSITIONS
   7.4. PREPARATION OF LUBRICANT COMPOSITIONS AND COATINGS
   7.5 MISCELLANEOUS APPLICATIONS

1. FIELD OF THE INVENTION

The present invention relates to phase stable lead monoxide powders in which substantially pure free flowing PbO having a crystal phase which is homogeneous, and which phase may be selected from either the litharge or massicot forms, retains such phase homogeneity over extended periods under ambient storage conditions or even under the influence of ultraviolet light. Furthermore, the present invention relates to lead monoxide powders and their oxalate precursors whose particles have a plate-like morphology and size which make them ideal for numerous applications including the preparation of compositions which are easily molded or worked into any desirable shape or which are useful as high temperature solid lubricants. These and other compositions, as well as methods for making and utilizing these novel preparations, are described in the following disclosure.

2. BACKGROUND OF THE INVENTION

For years, one of the major problems associated with using ceramic materials for high strength applications has been the inability to sinter the materials to theoretical density without the need for high temperatures and pressures. Pores remaining in the microstructure reduce the strength of the fired ceramic. In some of the first work of its kind, Rhodes showed a relationship between agglomerate size and sintering of yttria-stabilized zirconia for powders having an average crystallite size of approximately 10 nm (Rhodes, W. H. *J. Am. Ceram. Soc.* 1981, 64(1), 151-170). By eliminating agglomerates through sedimentation, he was able to lower the sintering temperature 300° C. for powders of identical crystallite size. This type of behavior has been demonstrated in other systems as well (See, for example, Tremper, R. T. and Gordon, R. S. in "Agglomeration Effects on the Sintering of Alumina Powders Prepared by Autoclaving Aluminum Metal;" *Ceramic Processing Before Firing*, Onoda, G. Y. and Hench, L. L. (Eds.); John Wiley and Sons, New York (1978) pp. 153-175; and Sordelet, D. J. and Akino, M. *J. Am. Ceram. Soc.* 1988, 71(12), 1148-1153).

In an attempt to improve the sintering characteristics of ceramic powders, chemical techniques to synthesize submicron particles have been widely investigated. One of these techniques is precipitation from homogeneous solution (PFHS). This method can provide uniform nucleation, growth and aging of the particles throughout the solution. Particle morphology and size can be controlled by changing different reaction parameters (ion concentrations, temperature, aging time, etc.). This technique is usually inexpensive and relies on simple benchtop chemistry to synthesize "ideal" (submicron and monosized) precursor particles.

In most cases, precipitated powders must be calcined to the oxide before processing can be initiated. In some cases, the smaller more reactive particles form solid aggregates due to surface area reduction driven initial stage sintering (for additional discussion of this process, the reader is referred to Lange, F. F. and Miller, K. T. *J. Am. Ceram. Soc.* 1987, 70(12), 896-900). When this aggregation occurs, advantages gained by controlled synthesis of the "ideal" particles are lost.

Chain aggregation during nucleation and growth of a particular phase has also been observed during heat treatment of freeze-dried aluminum sulfate (See, Johnson, D. W. and Schnettler, F. J. *J. Am. Ceram. Soc.*

1970, 53(8), 440–444). In the work of Johnson and Schnettler, very large 300–400 micron diameter frozen spheres of aluminum and iron sulfates were prepared. Within these amorphous sulfate droplets, chained aggregates of crystallites formed upon heating in a pattern established during the freeze-drying step. The authors state that the initial gamma-$Al_2O_3$ is transformed to the alpha phase, and, after the transformation, the alpha-$Al_2O_3$ nucleates and grows to provide the chained aggregates. This study involved chain aggregation within nearly millimeter-sized spheres and does not involve the interparticle association of dispersed micron- and submicron-sized lead oxide precursors.

In another study reported by Hirayama, T. in *J. Am. Ceram. Soc.* 1987, 70(6), C122–C124, a specially synthesized experimental transition $Al_2O_3$ powder with ultrafine spherical particles was found to have an alpha phase transition temperature of 1335° C. compared with the transformation temperature of 1280° C. observed for commercial samples. The author of this article noted that particle coarsening never occurred for the experimental $Al_2O_3$ particle until it transformed to the alpha phase, whereas, for the commercial samples, particle coarsening always preceded the transformation to the alpha phase. The material described in this article was unique, even for $Al_2O_3$ powders, and it behaved quite differently than readily available materials. The notion that particle coarsening occurs only at the alpha phase transition cannot be applied generally to all aluminum oxide preparations let alone to other oxide preparations composed of a transition metal component which is altogether distinct from aluminum.

2.1. POLYMORPHS OF LEAD MONOXIDE (PbO)

Lead oxide is known to have two polymorphic forms: the red-colored tetragonal alpha-lead oxide (referred to herein as "litharge") and the yellow-colored orthorhombic beta-lead oxide (referred to herein as "massicot"). The change from litharge to massicot occurs reversibly and is brought about without difficulty (See, for example, Brown, H. E. in "Lead Oxide Properties and Applications," First Edition, International Lead Zinc Research Organization, Inc., New York, N.Y. (1985), Ch. 13). Typically, subjecting a sample of massicot lead oxide to ball-milling conditions is sufficent to cause a transformation into the litharge phase. The enthalpy, $\Delta H$, of the transformation reaction has been calculated and found to be a very small 57 calories per mole at 27° C. The corresponding activation energy for the massicot to litharge transformation is a mere 2.6 kcal/mole under these ball-milling conditions (Senna, M. and Kuno, H. *J. Am. Ceram. Soc.* 1961, 54(5), 259–262).

On the other hand, the kinetic parameters of the polymorphic transition from litharge to massicot have been studied using a variety of techniques including isothermal and nonisothermal heating methods. The results of estimates for the activation energy in this direction vary widely and ranges from 92–306 kcal/mol (Morales, J. et al. *J. Mater. Sci.* 1983, 18, 2117–2125). Thus, it appears that, thermodynamically, lead oxide which exists as a mixture of litharge and massicot has a lower free energy than pure litharge lead oxide which, in turn, has a lower free energy than pure massicot (Brown, H. E. Ibid. p. 23). Hence, a phase homogeneous sample of massicot is expected, and has been observed, to revert to a mixture composed of litharge and massicot crystal phases (Petersen, M. *J. Am. Chem. Soc.* 1941, 63, 2617–2620). In the presence of hot water alone, PbO consisting of 85% massicot and 15% litharge was transformed to 100% litharge at all temperatures between 22° and 100° C. in a few minutes (Brown, H. E. Ibid. p. 28).

An article by Kiparisov, S. S. et al. which appeared in *Izvestiya Akademii Nauk SSSR, Neorganicheskie Materialy* 1976, 12(5), 891–895, reports the temperature of the litharge to massicot phase transition as being 489° C., although others (White, W. B. et al. *J. Am. Ceram. Soc.* 1961, 44(4), 170–174) have reported a range of 475 to 585° C. for this temperature, and the melting point of PbO as being 886° C. The authors state that the transition is reversible and that the conversion of the massicot phase to the litharge phase occurs slowly. The authors thus describe further a "metastable" state for the massicot phase of PbO at room temperature. Hence, these authors further reaffirm the well established principle that the massicot phase of PbO is unstable and is a transient species even at room temperature. The sintering experiments carried out by Kiparisov and co-workers were conducted at temperatures which were all above their reported PbO phase transition temperature of 489° C.

As stated above, at least three different methods of treatment of PbO have been noted to drive the transition from massicot to litharge: (i) heat, (ii) grinding and (iii) exposure to water.

2.1.1. EFFECT OF WATER ON LEAD MONOXIDE PHASE TRANSFORMATION

Clarke and Greene studied the effect of water vapor on the composition of lead oxide thick films (*Thin Solid Films* 1980, 66, 339–49). The films were grown on water-cooled aluminum wafers by the reactive evaporation of pure lead in a low pressure oxygen atmosphere. The films were approximately 45 $\mu$m thick composed of spherical grains 0.1–0.4 $\mu$m in diameter. The as-deposited films contained only massicot and free lead, as determined by X-ray diffraction.

Samples were immediately placed in atmospheres of controlled relative humidity (RH of 0, 20, 50 and 70% RH) after film deposition to study the effect of water vapor on the film composition. Samples soaked in 70% RH for 72 hrs showed only litharge and a trace of free lead. Samples maintained at 70% RH for 3 weeks showed only litharge and a trace of lead carbonate-lead hydroxide (plumbonacrite) species.

Samples soaked at the various levels of RH were then annealed in ambient air at 175° C. and quantitatively analyzed for phase content using Raman spectroscopy. The samples soaked at 0 and 20% RH were approximately 70% litharge with the balance being massicot and a trace of $Pb_3O_4$. The samples held at 50 and 70% were typically 99% litharge with the balance being massicot and $Pb_3O_4$. Samples annealed a second time in $N_2$ at 435° C. were composed of greater than 99% litharge with the remainder being massicot and $Pb_3O_4$. From SEM analysis, the double annealed samples showed evidence of sintering and grain growth, with the average grain size increased by a factor of approximately 5.

It is postulated that the films are deposited as massicot because they are in compression. White et al. determined that a pressure-temperature plot of the litharge-massicot system has a phase boundary with a negative slope (White, W. B.; Dachille, F.; Roy, R. *J. Amer. Ceram. Soc.* 1961, 44(4), 170–174). Apparently, the high pressure associated with the compressed films studied by Clarke and Greene led to the formation of the high temperature polymorph at temperatures which are lower than what might have been expected.

Sorrell has studied the effect of liquid water on lead monoxide samples (Sorrell, C. A. *J. Amer. Ceram. Soc.* 1972, 55(1) 47). Three different types of lead oxide samples were studied: (1) reagent-grade PbO (85% massicot determined by X-ray diffraction); (2) 100% massicot; and (3) fine-grained massicot produced by vapor deposition. Sample 2 was prepared by heating the reagent grade PbO to 600° C. Appreciable grain growth and densification was observed for this powder. Powder samples were placed in water for up to 1 yr. Sample 1 transformed to 100% litharge in the time necessary for wetting, decanting and drying of the sample. Sample 2 showed no transformation within a year, and Sample 3 transformed within 48 hrs. However, all indications in the article point to the conclusion that these samples are dense, sintered materials and not free flowing.

Sorrell proposed three possible mechanisms for PbO transformation in water. The first mechanism involves the polar water molecule relieving strain in the metastable massicot through interaction with the particle surface. The second mechanism involves dissolution of the PbO and reprecipitation of litharge on the surface with subsequent inward transformation. However, less polar liquids such as acetone, ethanol, and n-propanol do not induce the transformation even though the solubility of PbO in these solvents is appreciable. The third mechanism involves a change in the stoichiometry of the powder by the addition of oxygen atoms derived from hydroxide ions. This last mechanism would only be viable if the oxygen:lead ratio in the litharge was found to be larger than that recorded for the massicot.

2.1.2. EFFECT OF GRINDING ON LEAD MONOXIDE PHASE TRANSFORMATION

Several studies have been performed to determine the effect of grinding PbO to induce the litharge to massicot phase transformation. In one study, the effect of grinding pure massicot samples in a dry ball mill was investigated (Clark, G. L. and Rowan, R. *J. Am. Chem. Soc.* 1941, 63(5), 1302-1304). Samples of massicot were ground for various times between 0.5 and 60 hours. It was found that for samples ground for 3 hours or more, all the massicot was converted to litharge, as determined from X-ray diffraction analysis.

Lewis et al. performed a more intensive study of the effects of milling on litharge and massicot (*J. Appl. Cryst.* 1969, 2, 156-164). Samples of pure litharge and pure massicot were ground in a variable temperature ball-mill at temperatures between −196° and 200° C. for up to 30 min. In all cases, the ground samples were found to be a mixture of litharge and massicot. The general trend indicated that an increase in grinding temperature and time raised the degree of transformation to a maximum value of approximately 60% of the material transformed. Complete conversion of the pure starting material to the second polymorph could not be achieved under any conditions. No nucleation period was observed for the transformation of massicot to litharge, while one was observed for the reverse transformation. It was postulated that this behavior could be attributed to a difference in the potential energies of the two lead monoxides, which difference has already been mentioned above.

2.1.3. STUDIES OF LEAD MONOXIDE PHASE TRANSFORMATION UNDER VACUUM

Peterson studied the preparation of hydrated lead oxide under various solution conditions and observed their dehydration in a vacuum (*J. Am. Chem. Soc.* 1941, 63, 2617-2620). Hydrated oxides heated at 120° C. decomposed to give oxides consisting of both litharge and massicot. Lead carbonate precursors were also decomposed and those having the smallest particle sizes (0.2-0.4 microns) decomposed to give a mixture of litharge and massicot. The carbonates showed similar behavior to the hydrated oxides when decomposed at 250° C., but the proportion of massicot was less than that found in the case of the hydrates.

Petersen also discloses a solution preparation of lead oxide crystals which he describes as thin flakes of yellow oxide clusters which can attain several millimeters in size. He states further that these large crystals show little of the red phase even after several years. However, he observed that his samples of finer materials were unstable, transforming to the red form in a few days while stored in a dessicator at room temperature. Finally, Petersen reports that the phase transformation temperature he observed was around 489°±1° C. and that the conversion of yellow to red lead oxide can be performed by heating the yellow oxide at 420°-430° C. in a vacuum for two to three weeks.

2.1.4. FORMATION OF MASSICOT FROM SOLUTION

Single crystals of massicot have been grown by saturating a hot 6-8M NaOH solution with lead monoxide (Soderquist, R. and Dickens, B. *J. Phys. Chem. Solids* 1967, 28, 823-827). These crystals transformed spontaneously to litharge within a few days. When the litharge crystals were heated, polycrystalline aggregates of massicot were obtained.

The effect of impurity ions on the transformation of massicot to litharge in precipitated lead oxides has been studied (Kwestroo, W. et al. *J. Inorg. Nucl. Chem.* 1967, 29, 39-44). Lead basic acetates ($Pb(CH_3COO)_2 \cdot 2Pb(OH)_2$) and $Pb(OH)_2$ were prepared by mixing solutions of lead acetate and ammonium hydroxide. After precipitation of the salts, the reaction mixture was stirred at room temperature, and a change in the color of the precipitate from white to green was monitored. This green compound was massicot which subsequently transformed to litharge upon continued contact with the supernatant at 60° C. Ion concentrations of 10 ppm or higher of germanium, selenium, molybdenum and tungsten inhibited the solution transformation. Similarly, silicon, arsenic and antimony inhibited the solution transformation at concentrations of 50 ppm or greater. For phosphorus and tellurium, a concentration of 100 ppm or higher was found necessary to inhibit the transformation effectively.

Thus, it has been generally accepted that pure samples of massicot lead monoxide are prone to transform to the litharge form more readily than lead monoxide which contains small amounts of a heavy atom impurity, typically, another metallic species. In fact, massicot lead monoxide powders are usually combined with an exogenous agent such as Cabosil ®, a form of silicon dioxide, to stabilize the massicot crystal form.

2.2. PLASTICITY OF CERAMIC PRECURSOR MATERIALS

The workability or plasticity of a precursor to a ceramic material is an important physical characteristic which is highly desirable during the processing of such precursors and their manufacture into finished product. Most precursor materials lack a plate-like morphology and do not have the appropriate particle size distribution. Hence, such materials need the plasticizing effect of added organic processing aids to render the precursor workable (See, for example, Phelps, G. W. *Ceramic Age* 1947, September issue; Reed, J. S. "Introduction to the Principles of Ceramic Processing," John-Wiley and Sons, New York, N.Y. (1988) pp. 355-378). Usually such processing aids have a fairly high molecular weight or are sufficiently nonvolatile such that their complete removal is costly and problematic. Moreover, the residues of such processing aids are a source of impurity and may result in structural failure of the ceramic part during the manufacturing stage or sometime thereafter. Some materials, such as moist clay, however, are easily extruded or pressed into desired shapes. Unfortunately, very few precursor powders have the morphology required to exhibit plasticity or workability. For a more detailed discussion regarding the flow properties of mineral precursor compositions and the relationship of such flow properties and the structure of the precursor, especially plate-like crystalline morphology, the reader is referred to Norton, F. H. "Fine Ceramics Technology and Applications," Robert E. Krieger Publishing Company, Inc., Malabar, Fla. (1987, Reprint 1978 with corrections) pp. 133-148.

Single crystal platelets of both litharge and massicot lead monoxide have been prepared from dilute sodium hydroxide solutions (Keezer, R. et al. J. Applied Phys. 1968, 19(4), 2062-2066). These crystals were used in photoconductivity measurements and had very large dimensions ($3 \times 3 \times 0.1$ mm). These very large crystals would not be useful in free flowing ceramic powder applications.

2.3. PREPARATION OF CERAMIC POWDERS

Ceramic metal oxide powders, as well as their precursor powders (e.g., metal salts, metal alkoxides and metal carboxylates), have been prepared by a variety of methods, including electrochemical, thermal, solution and chemical techniques. The following discussion focuses on the nature of various chemical synthetic methods.

2.3.1. CHEMICAL SYNTHESIS ROUTES

Several different chemical synthesis methods for ceramic powders are known. These techniques include alkoxide hydrolysis, laser synthesis, sol-gel formation, spray drying, freeze drying and hydrothermal methods. Each method, however, suffers from one or more drawbacks including low metal ion concentrations, long reaction times and the need for expensive reagents and/or equipment. Nevertheless, each of these techniques have found use in the synthesis of ceramic powders, particularly those used in electronic applications (See, for example, Fegley, B. et al. *J. Am. Ceram. Soc.* 1984, 67(6), C113-C116; Komarneni, S. et al. *J. Am. Ceram. Soc.* 1988, 71(1), C26-C28; deLau, J. G. M. *Am. Ceram. Soc. Bull.* 1970, 49(6), 572-574; Johnson, D. W. et al. *Am. Ceram. Soc. Bull.* 1974, 53(2), 163-67; Rice, G. W. *J. Am. Ceram. Soc.* 1987, 70(5), C117-C120; and Lee, M. H. et al. *J. Am. Ceram. Soc.* 1987, 70(2), C35-C36).

2.3.2. POWDER PRECIPITATION

The technique of precipitating powders from solution has long been known for the synthesis of certain ceramic powders. Usually, metal oxide precursors, which must be calcined to the metal oxides, are precipitated from solutions of the corresponding cationic and anionic components of the precursor. The precipitation is performed by combining a solution of a soluble salt of the metal, e.g., nitrates, sulfates, acetates and the like, with a solution of a precipitating anion, e.g., oxalates, carbonates or hydroxide ions. Changes in the pH of the cationic solutions can also bring about precipitation.

Two types of precipitation techniques are commonly utilized, as reported in the literature: (i) direct or reverse strike and (ii) precipitation from homogeneous solution (PFHS). These precipitation processes are simple and can be performed utilizing inexpensive reagents and equipment. Unfortunately, no significant methods have yet been developed for the synthesis of value-added materials, i.e., powders of precursors or of the calcined products which have specific structural, physical, chemical and electrical characteristics which are desirable in a particular industry (e.g., the manufacture of components useful in the electronics industry).

2.3.2.1. DIRECT STRIKE PRECIPITATION

Brown has precipitated magnesium oxalate using a technique which is known as "direct strike" (See, for example, Brown, R. A. *Am. Ceram. Soc. Bull.*, 1965, 44(6), 483-87). By this method, magnesium metal is dissolved in concentrated nitric acid and precipitated as the insoluble metal oxalate by the addition of aqueous ammonium oxalate solution. Conversely, the addition of the cationic solution to the anionic solution is known as "reverse strike" precipitation. The $MgC_2O_4 \cdot 2H_2O$ particles obtained by this method are not of uniform size or morphology. In addition, contaminating cations are typically incorporated into the final product by this method.

Direct or reverse strike techniques precipitate powders in a localized fashion. In other words, precipitation takes place where the first solution drop enters the second solution. The solubility of the precursor salt is exceeded in this localized area and precipitation is instantaneous. Consequently, any cationic impurities that may be present are swept up and incorporated into the precipitate. Previous workers have sought to eliminate such impurities, especially in the stock solutions, by successive additions of small portions of precipitating anionic solution. Highly sinterable hydroxides, carbonates and oxalates of erbium and yttrium have been synthesized employing the reverse strike techniques (See, for example, Jordan, G. W. and Berard, M. F. *Ceram. Int.* 1985, 11(6)).

Rassmussen, M. D. et al. have compared the sinterability of yttrium hydroxide prepared by direct and reverse strike methods (*Ceram. Int.* 1985, 11(2), 51-56). Their study shows that oven-dried powders precipitated by the reverse strike method at a final pH of 10.5 sintered to a much higher density (98.8% of theory) than powders obtained from the direct strike technique (69.4% of theory). This work demonstrates that under certain conditions, the order of addition of the cationic and anionic solutions can affect the final processing characteristics of the powder, possibly by changing the physical characteristics of the powder. However, no investigation into a possible change in the particle morphology has been conducted.

2.3.2.2. PRECIPITATION FROM HOMOGENEOUS SOLUTION (PFHS)

PFHS techniques have been used for over 50 years to synthesize metal salt powders. In contrast to the localized precipitation observed for direct or reverse strike techniques, precipitation from homogeneous solution takes place simultaneously throughout the entire reaction solution. Through control of the pH or control over the release of a precipitating species (cation or anion), the nucleation and growth of the particles can be uniform. The mechanism of nucleation and growth of precipitates using PFHS techniques has been described by LaMer, V. K. et al. in *J. Am. Chem. Soc.* 1950, 72(11), 4847–4854.

The dynamics of a solution during the PFHS process has been explored in the literature (Blendell, J. E. et al. *Am. Ceram. Soc. Bull.* 1984, 63(6). 797–802). For instance, the solubility Of a particular precursor salt may change as a function of solution pH. The pH of the solution can be modified, in turn, by the decomposition or hydrolysis of a reagent, such as urea. As the pH increases, the solubility limit of the precipitating salt is reached. However, precipitation does not occur even though the solubility limit of the salt has been exceeded until the nucleation limit has also been reached. At this point a burst of nuclei is formed which relieves the degree of supersaturation in the solution. If this burst is short and relieves the degree of supersaturation to a point below the nucleation concentration, only growth will occur and the particles will be monodisperse, i.e., the particles will have a uniform size.

Alternatively, homogeneous precipitation may be brought about by the decomposition of a chelate, which decomposition releases one of the precipitating ions. In this case, the concentration of the precipitating salt in the solution increases until the nucleation limit is exceeded. By changing the concentration of the reactants, the period during which the particles nucleate and grow can be lengthened to provide a fairly wide particle size distribution.

Because of the gradual change in the solution conditions, PFHS techniques tend to reduce the amount of coprecipitated impurities. In addition, the procedures are simple, utilize inexpensive reagents and allow for near quantitative precipitation of cations. Because of the relative ease with which their hydrolysis kinetics can be controlled, urea and formamide are commonly used to alter the solution pH (Blendell, J. E. et al. *Am. Ceram. Soc. Bull.* 1984, 63(6), 797–802).

In a study which was limited to the preparation of $Y_2O_3$ precursor particles, the physical characteristics of the precipitate was altered by varying the solution precipitation conditions, e.g., reactant concentrations, aging temperature and time (See, Sordelet, D. and Akinc, M. *J. Coll. Int. Sci.* 1988, 122(1), 47–59). Monosized spheres, irregular agglomerated particles, platelike particles and particles having irregular surface roughness were obtained under a variety of conditions. The conditions which give rise to a particular particle morphology cannot be applied generally, however.

Aiken and co-workers have described how a phase diagram representing particle morphology as a function of precipitation conditions can be constructed (B. Aiken, B. et al. *J. Am. Ceram. Soc.* 1988, 71(10), 845–853). Such investigations may provide further insight into understanding the conditions conducive to ideal particle growth.

2.3.3. TECHNIQUES FOR PRECIPITATION OF OXALATE PRECURSORS

Metal oxalate precursors have been synthesized using PFHS techniques (See, a review by Gordon, L. et al. in "Precipitation from Homogeneous Solution," John Wiley and Sons, New York, N.Y. (1959) pp. 61–62). Three methods of precipitation have been described: (i) hydrolysis of urea which gives rise to an increase in the pH of a solution containing $HC_2O_4^-$, (ii) hydrolysis of dimethyl oxalate and (iii) hydrolysis of diethyl oxalate. Hydrolysis of urea was used for the synthesis of calcium oxalate. Dimethyl oxalate hydrolysis has been used to precipitate calcium, thorium, actinium and uranium oxalates while diethyl oxalate hydrolysis has been used to prepare oxalates of magnesium, manganese, calcium and zinc. Some oxalates, like $ZnC_2O_2.2H_2O$, precipitate as the hydrates

2.3.3.1. LEAD SYNTHESIS

Synthesis techniques utilized for $PbC_2O_4$ have involved direct strike precipitation methods. Perlich et al. (*J. Phys. Chem.* 1942, 46, 561–570) added 1L of a 0.1M lead nitrate solution containing 20 mL of acetic acid to 1L of 0.014M ammonium oxalate solution while stirring. Alternatively, excess oxalic acid has been used to precipitate lead oxalate from a solution of lead nitrate (Yankwich, P. E. and Copeland, J. L. *J. Am. Chem. Soc.* 1957, 79, 2081–2086).

A PFHS technique for the synthesis of lead oxalate has been reported (Hedstrom, H. et al. *J. Inorg. Nucl. Chem.* 1977, 39, 1191–1194) which involved raising the pH of an acidic solution containing divalent lead and oxalic acid by the slow addition of a urea solution. This slow urea diffusion technique gave rise to the formation of large crystals.

2.4. PRECURSOR POWDER CALCINATION

Precipitated precursor powders must often be calcined to form the corresponding metal oxides. During the decomposition of the precursor metal salt the evolution of gases from the sample can make the success of the calcination process sensitive toward firing atmosphere. For instance, a carbon dioxide atmosphere would not be suitable for the decomposition of a metal carbonate because a high partial pressure of $CO_2$ would stabilize the carbonate salt. In general, high partial pressures of evolved gases tend to stabilize the precursor salt.

Moreover, inefficient or slow diffusion of evolved gases away from the particles can pose major problems when calcining large powder batches. Stabilization of the salt due to poor diffusion of gases evolved inside the powder samples can cause heterogeneities in the powder sample and give rise to longer calcination times then would be expected.

In many cases, the smaller particles obtained by precipitation techniques are highly reactive. In some cases, these particles form hard aggregates during calcination due to their higher reactivity. In such a case, all processing advantages associated with the chemical synthesis of submicron particles would necessarily be lost. Thus, the production of nonaggregated submicron metal oxides is often frustrated by the nature of the precursor itself.

2.4.1. FORMATION OF HARD AND SOFT AGGLOMERATES DURING CALCINATION

Agglomerates which occur in ceramic powders can be separated into two categories: soft and hard. Soft agglomerates are formed by electrostatic, magnetic, Van der Waals, or capillary forces between particles. Almost all powders form soft agglomerates when dried. By dispersing these powders in solution under proper pH conditions, or with surfactants, soft agglomerates can often be eliminated. Also, shear stresses which are often associated with ceramic-forming processes can break down soft agglomerate structures. The smaller particles which result often provide solid bodies having higher sintered densities and more desirable mechanical properties.

Hard agglomerates are formed when chemical bonding occurs between the particles. This type of bonding cannot be eliminated by dispersion in liquid, and high forming pressures must be employed to eradicate them. Milling processes which can be used to eliminate hard agglomerates are undesirable due to increased processing cost, delay of further manufacturing steps and the high probability of introducing contaminants into the product.

Ciftcioglu and co-workers have investigated the effectiveness of using ultrasonic energy to break up hard agglomerates as a function of calcination temperature (Ciftcioglu, M. et al. *J. Am. Ceram. Soc.* 1987, 70(11), C329-C334).

2.4.2. CALCINATION OF LEAD OXALATES

Lead oxalate is a precursor salt which is used as an intermediate en route to the production of the lead oxide powder. This compound is a more attractive precursor than carbonates (oxalates generally have lower calcination temperature), sulfates (use of oxalates avoids sulfur contamination), and nitrates (nitrates often melt before decomposing to the oxide).

The decomposition of $PbC_2O_4$ is highly dependent on firing atmosphere. Early work by Bircumshaw and Harris (*J. Chem. Soc.* 1948, 1898-1902) reported that the decomposition reaction proceeds as depicted by Eq. (2):

$$3PbC_2O_4 = 2PbO + Pb + 2CO + 4CO_2 \quad (2)$$

in which two moles of carbon dioxide are formed for each mole of lead monoxide. The analyses were performed under vacuum at isothermal temperatures of 309°, 325°, 335° and 350° C. This decomposition stoichiometry was also observed for samples fired in $N_2$ (Dollimore, D. et al. *J. Chem. Soc.* 1963, 2617-2623).

Other work on samples fired in air showed the decomposition process of Eq. (3):

$$PbC_2O_4 = PbO + CO + CO_2 \quad (3)$$

in which equimolar amounts of carbon dioxide and lead monoxide are produced (See, for example, Strizhkov, B. V. et al. *Russ. J. Inorg. Chem.* 1962, 7(10), 1220-1223; and Morsi, S. E. *U.A.R.J. Chem.* 1970, 13(1), 113-120). The temperature of decomposition is reported to lie in the range of 300° to 400° C. for both mechanisms.

The variation in observed reaction stoichiometry has been attributed to the lack of oxygen under vacuum or an inert atmosphere such as $N_2$. In the absence of oxygen, one mole of lead monoxide is reduced by one mole of carbon monoxide to give elemental lead and carbon dioxide. At 375° C. the equilibrium constant for this reversible reduction is on the order of about $10^{37}$. Because oxygen is not present to oxidize the CO to $CO_2$, PbO functions as the oxidant. The two mechanisms can be distinguished by monitoring the weight loss on ignition (LOI). Eq. (2) gives an LOI of 26.2 wt % while Eq. (3) gives an LOI of 24.4 wt %.

2.5 LEAD MONOXIDE APPLICATIONS

Lead monoxide powders are useful in a wide variety of applications including, but not limited to, the preparation of mixed metal ceramic components for electronics applications, such as lead-magnesium niobate, lead zinc niobate, lead-titanium oxides (See, for example, Swartz, S. L. et al. *J. Am. Ceram. Soc.* 1984, 67(5), 311-315; and Halliyal, A. et al. *J. Am. Ceram. Soc.* 1987, 70(2), 119-124); the preparation of electrodes for long-life batteries; and the preparation of ultrasonic sensors. Lead monoxide has also found use in the catalysis of chemical reactions, such as the liquid phase oxidation of ethylbenzene (Bacherikova, I. et al. *Neftekhimiya* 1975, 15(95), 750-755). Oxides of lead have also been used as ingredients in explosive compositions. In one study, the addition of 1 part carbon black and 2 parts PbO caused a considerable increase in the combustion rate of ballistic compositions while the addition of only one of these ingredients had no effect. The authors postulate that the carbon black prevents the agglomeration of the PbO (Denisyuk, A. et al. *Friz. Goreniya Vzryva* 1978, 14(6), 29-36).

In some cases, the effect of litharge lead monoxide differed from that of the massicot form. For example, the thermal dehydrochlorination of poly(vinyl chloride) proceeded differently depending on the crystal form of the PbO employed (Popova, Z. et al. *Tr. Khim. Khim. Tekh.* 1964, 2, 322-325); litharge and massicot PbO gave rise to different kinetics of formation of $4PbO \cdot PbSO_4$ (Pavlov, D. and Iliev, V. *Ext. Abstr., 28th Meet.-Int. Soc. Electrochem.* 1977, 2, 109-111); and massicot lead monoxide was used for the preparation of dibasic lead stearate which had no tendency to dust (*Chem. Abstracts* 83:78614m). Furthermore, it is generally known that massicot lead monoxide has a much more rapid dissolution rate in aqueous solution than the litharge form.

Moreover, lead monoxide powders have been used as components of solid lubricants and high temperature coatings. For instance, PbO, along with $MoS_2$ and graphite, provided lubricity and low heat conductivity during titanium ring forging (Gurney, F. et al. *Tech. Paper, Soc. Mfg. Eng.* 1974, MF 74-627); as solid lubricant for high temperature applications (See, for example, Miyakawa, Y. et al. *Junkatsu* 1970, 15(10), 657-672; Miyakawa, Y. et al. Ibid. 1970, 15(8), 469-477; Miyakawa, Y. et al. Ibid. 1970, 15(7), 391-406; Peterson, M. and Johnson, R. *Lubr. Eng.* 1957, 13, 203-207). In addition, the following patents describe representative uses of lead monoxide in lubricant compositions and coatings: DE 1,092,589; JP 78-22,805; JP 76-55,757; U.S. Pat. No. 3,497,376; and U.S. Pat. No. 3,347,650.

In summary, there exists a need for a process for the preparation of dispersible lead monoxide powder having micron- or submicron-sized particles which avoids the agglomeration or aggregation of the particles to clusters having much larger dimensions, whether they be of the lead monoxide precursor or of the final lead monoxide product itself, encountered during the decomposition, or alternatively, the calcination stage of the process. In addition, there exists a need for lead monoxide powders which are capable of exhibiting plastic or workable characteristics when combined with a suitable liquid component, preferably one which is volatile and which can be removed easily. Furthermore, there is a distinct need for a lead monoxide powder whose crystal phase is substantially homogeneous, preferably massicot, and which retains its phase homogeneity for substantial periods of time under ambient storage conditions. A dispersible lead monoxide powder having a substantially plate-like morphology would be particularly useful as a key ingredient in a lubricant composition suitable for use in oxidizing atmospheres.

3. DEFINITIONS

Unless otherwise indicated, the following terms, as used herein, are defined as follows:

Aggregation. The combination or clustering of micron- or submicron-sized particles which leads to an increase in average size of the collective powdered sample, usually amounting to about 100 times the size of the initial particles.

Sintering. A mechanism for aggregation which is thermodynamically driven by surface area reduction and effected by various mass transport processes.

Calcination. Heating of a solid to a temperature below its melting point to bring about a state of thermal decomposition, reaction between solids of different chemical composition or a phase transition (transformation) other than melting. Calcination may bring about thermal dissociation or decomposition, polymorphic phase transformations (e.g., conversion of anatase form of $TiO_2$ to the rutile form) or thermal (e.g., devitrification of glass).

Plasticity. The property of a material which allows it to be permanently deformed without structural rupture and which property is governed by the presence of colloidal-sized particles having a plate-like morphology. Generally, a powder whose particles have a plate-like morphology and which has at least about 10 percent by weight of the particles in the colloidal size range (a few nanometers to a few microns) will exhibit a plastic or workable property.

4. SUMMARY OF THE INVENTION

According to the present, a phase homogeneous crystalline lead monoxide powder comprising substantially pure free flowing massicot lead monoxide has been prepared and found to retain its massicot crystalline form under ambient temperature, pressure and humidity conditions for a period of at least about 6 months, indeed for some older samples over 30 months, as evidenced by the failure to detect any significant peaks attributable to the litharge crystalline form in the powder X-ray diffraction pattern obtained for a sample of the lead monoxide. Surprisingly, it has also been discovered that the phase homogeneous (massicot) lead monoxide powder of the present invention does not transform to the more thermodynamically favored litharge phase even under continuous exposure to ultraviolet radiation for a period of about 3 months.

The lead monoxide powders of the present invention are substantially pure, at least about 99% pure, containing no significant amounts of heavy atom additives or impurities. The present powders do contain, however, a very small amount of residual carbon derived from the organic lead compound precursor. The present powders contain, on the average, about 0.1 percent by weight of the residual carbon, but may contain as little as about 0.01 to as much as about 0.5 percent by weight of the residual carbon without significant ill effect. The lead monoxide powders of the present invention may also be prepared with a plate-like morphology and colloidal particle sizes ranging from about 0.1 to about 10 microns in diameter. The particle size distribution can also be made fairly narrow with average particle sizes ranging from about 0.5 to about 5 microns, preferably about 1 to about 3 microns. Most preferably, the average ESD of the powder particles is about 1 micron.

Another object of the present invention is the preparation of a biphasic crystalline lead monoxide powder comprising substantially pure free flowing lead monoxide the crystal phase of which is proportioned between preselected amounts of litharge and massicot and which proportion remains substantially unchanged over time under ambient conditions or under the influence of ultraviolet radiation. Again, the biphasic lead monoxide of the present invention is substantially pure, containing only a residual amount of carbon derived from the organic lead monoxide precursor. For both the phase homogeneous and biphasic lead monoxides, the preferred lead monoxide precursor is lead oxalate prepared by a modified precipitation from homogeneous solution (PFHS) method.

By employing the methods of the present invention, a biphasic lead monoxide powder can be obtained in which the crystal phase of the lead monoxide is proportioned between about 2 to about 98 wt % litharge and about 98 to about 2 wt % massicot, and which proportion remains substantially unchanged for at least about 6 months up to over 30 months under ambient storage conditions or even under up to 3 months of continuous exposure to ultraviolet radiation.

Indeed, the lead monoxide powder of the present invention is chemically stable under the influence of constant exposure to ultraviolet radiation as evidenced by the substantial retention of the original color of a sample of the lead monoxide powder. Thus, for example, while a greenish-yellow sample of the invention substantially retained its color under exposure to a uv lamp for 37 days (the length of the test period), a yellow-orange sample of a lead monoxide powder prepared according to the prior art (e.g., Example 1, Sample 8, U.S. Pat. No. 4,117,104) turned completely gray with some tan specks under the identical conditions. Thus, unlike the lead monoxide of the present invention, which exhibited prolonged chemical stability, the lead monoxide of the prior art visibly decomposed under the influence of constant uv exposure.

The colloidal massicot lead monoxide of the present invention can be used in a wide variety of applications and compositions. For instance, a photosensitive composition comprising colloidal massicot lead monoxide and a silver halide emulsion can be obtained.

Yet another object of the present invention is a crystalline lead monoxide powder comprising substantially pure free flowing lead monoxide having a degree of plate-like morphology which is effective to convey plasticity or workability to compositions comprising at least about 50 volume percent of said lead monoxide and up to about 50 volume percent of a suitable volatile liquid component. The proportion of the powder particles which are colloidal (i.e., those having an average particle size ranging from about 0.1 to about 5 microns) is critical but varies according to the particular application (e.g., wet-pressing, jiggering, forming, extrusion and the like). Generally, however, the amount of colloidal platelet particles present in the overall composition should be at least about 10 percent by weight of the composition. With the plate-like crystalline lead monoxide powder of the present invention, compositions comprising the powder and a suitable volatile liquid component, usually an aqueous solvent, a low boiling organic solvent or miscible mixtures thereof, can be prepared and formed into any desired shape before proceeding to subsequent manufacturing steps. Thus, such compositions may be stamped, pressed, rolled, extruded and processed further.

Still another object of the present invention involves providing a lubricant comprising a sufficient amount of lead monoxide or a suitable precursor thereof, which lead monoxide or suitable precursor has a substantially plate-like morphology and suitable colloidal particle size distribution. Thus, a crystalline platelet morphology, when present in a powder whose particles have an average particle size of about 0.1 to about 5 microns in diameter, preferably 1 to about 3 microns in diameter, provides a highly desirable solid lubricant or coating. The lubricant of the present invention can thus be utilized in a number of applications including reducing the friction between the surfaces of solid objects. In a particular embodiment of the present invention, the present lead monoxide or suitable precursor thereof can be used in a method of lubricating metal surfaces which are intermittently exposed to temperatures exceeding about 500° C. comprising establishing a layer of lead monoxide or a suitable precursor thereof to the metal surface to be lubricated, which lead monoxide or suitable precursor has (i) a substantially plate-like morphology and (ii) an average particle size of about 0.1 to about 5 microns in diameter as determined by photosedimentation methods. Consistent with the other objects of the present invention, such a lubricant composition can be prepared with lead monoxide which is substantially phase homogeneous or, if desired, with the crystal phase of the lead monoxide distributed between litharge and massicot in virtually any preselected proportion.

It is a further object of the present invention to provide a process for making a nonaggregated calcined lead monoxide powder comprising heating a lead monoxide precursor, preferable lead oxalate, at a preselected temperature for a period of time sufficient to convert the precursor to the desired lead monoxide. The preselected temperature of this process is preferably below the phase transformation temperature of lead monoxide, and, if so, the resulting nonaggregated calcined lead monoxide powder is closest in size to that of the organic lead monoxide precursor.

It is yet another, more specific, object of the present invention to provide a process for making a plate-like nonaggregated calcined lead monoxide powder comprising heating lead oxalate at a preselected temperature which ranges from about 400° to about 600° C. for a period of time sufficient to convert the starting lead oxalate to the product lead monoxide. The lead monoxide so produced may have an average particle size of about 0.1 to about 5 microns in diameter as determined by photosedimentation methods.

These and other objects of the present invention should be apparent to one of ordinary skill, particularly after reflecting further on the following additional discussion which is provided to illustrate in greater detail particular powders, compositions and methods of the present invention.

5. BRIEF DESCRIPTION OF THE FIGURES

FIG. 1 SEM micrograph of $PbC_2O_4$, precipitated in 85 vol % acetic acid by hydrolysis of diethyl oxalate.

Figure 2:
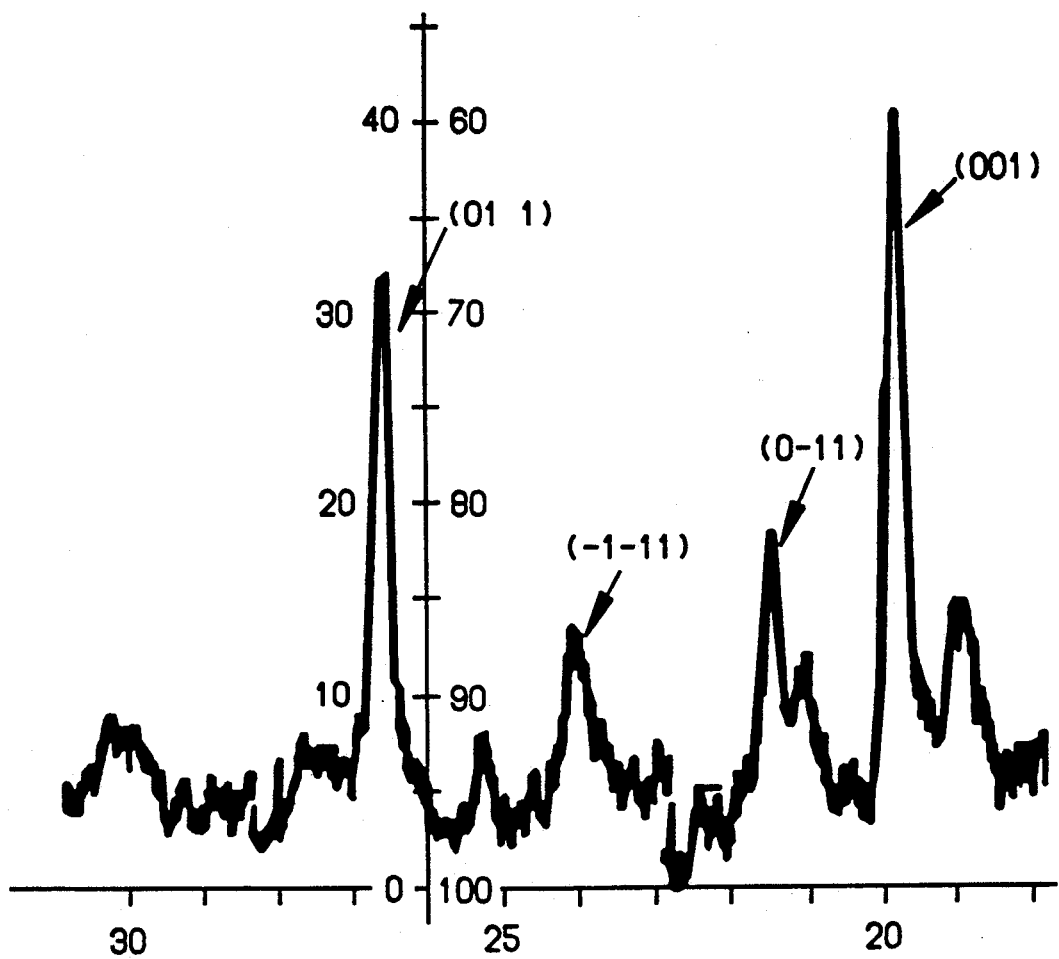

FIG. 2 XRD analysis of a $PbC_2O_4$ precursor powder of the present invention.

Figure 3A:
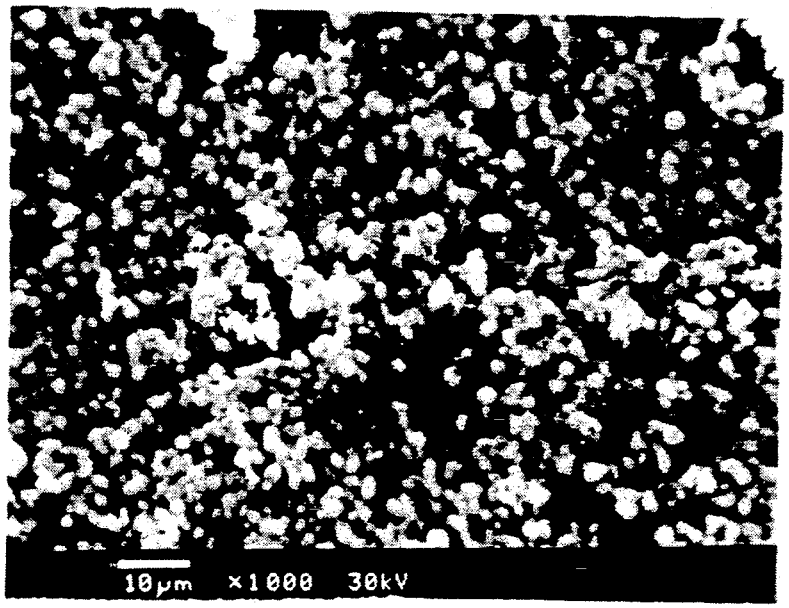

FIG. 3(a-b) SEM micrographs of $PbC_2O_4$ precipitated in 85 vol % acetic acid at 70° C. with a) 0.0M and b) 0.130M ammonium acetate.

Figure 4:
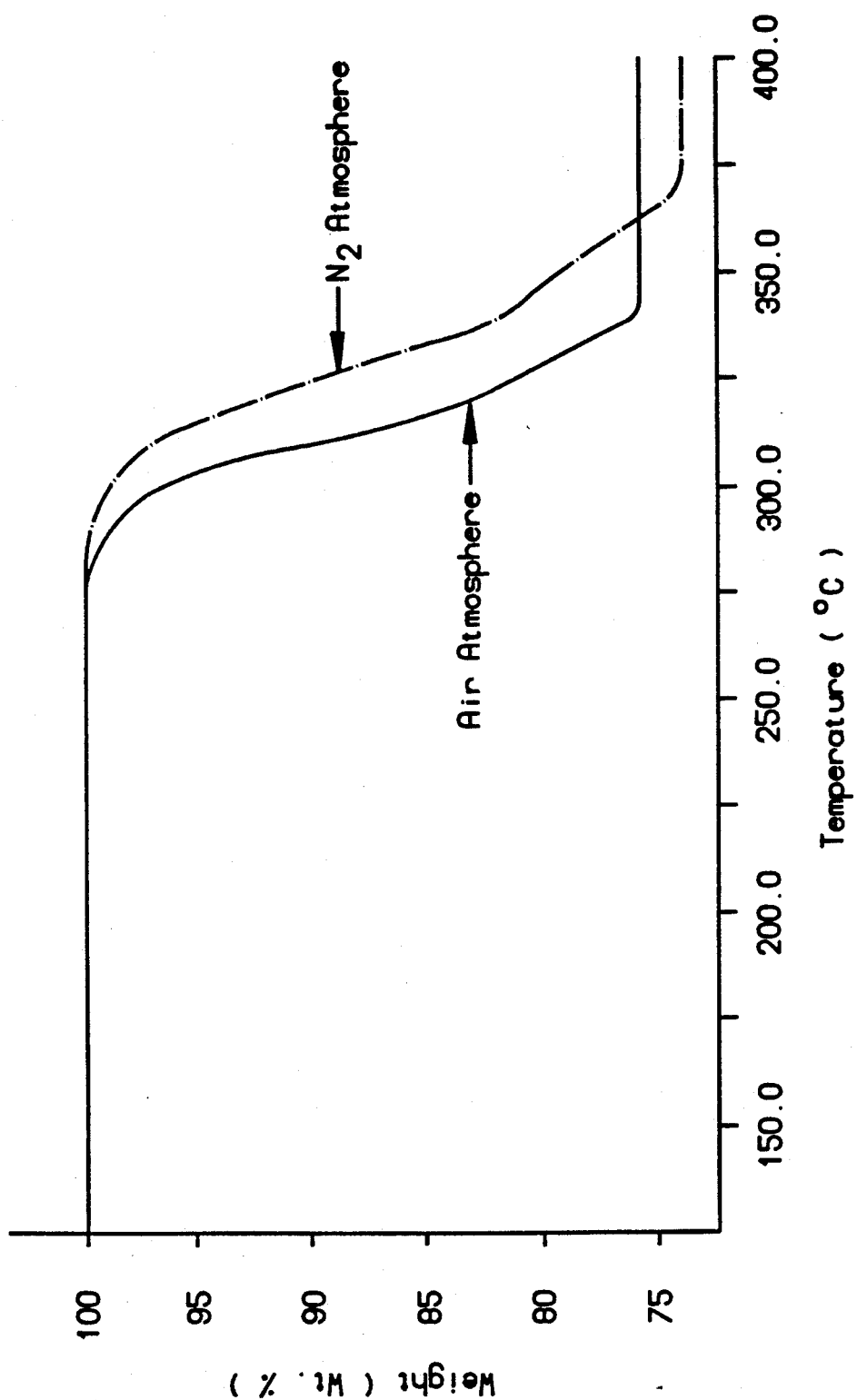

FIG. 4 TGA of $PbC_2O_4$ in flowing air and $N_2$ atmospheres.

Figure 5A:
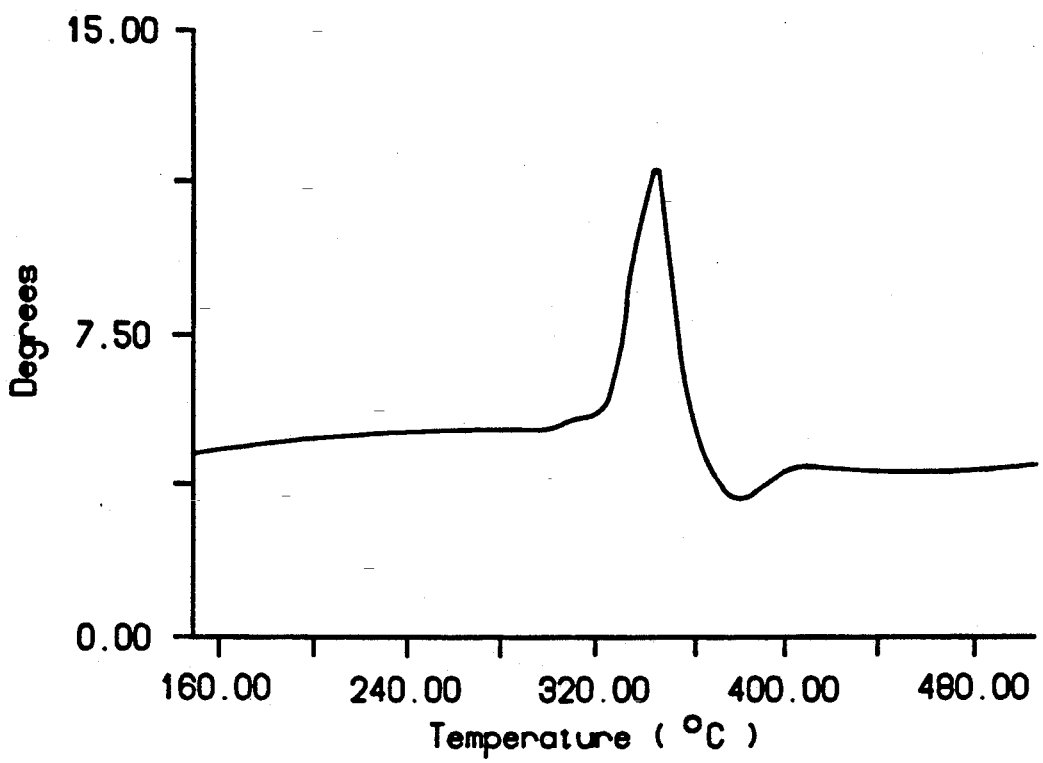
Figure 5B:
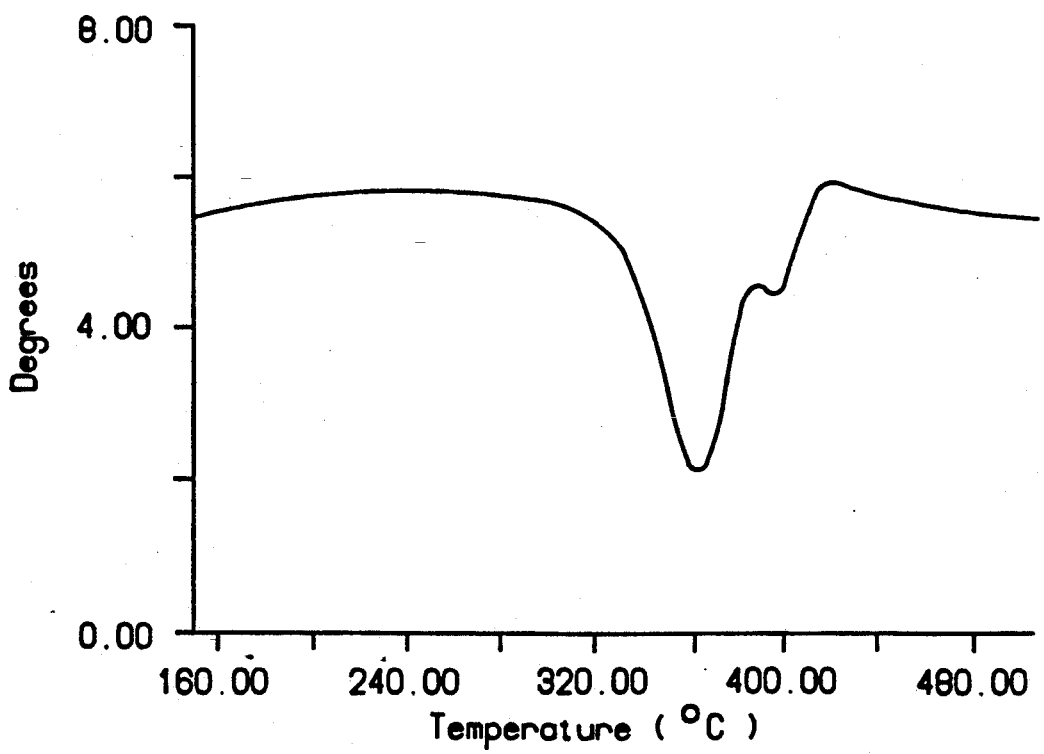

FIG. 5(a-b) DTA of $PbC_2O_4$ in atmospheres of flowing a) air and b) $N_2$.

Figure 6A:
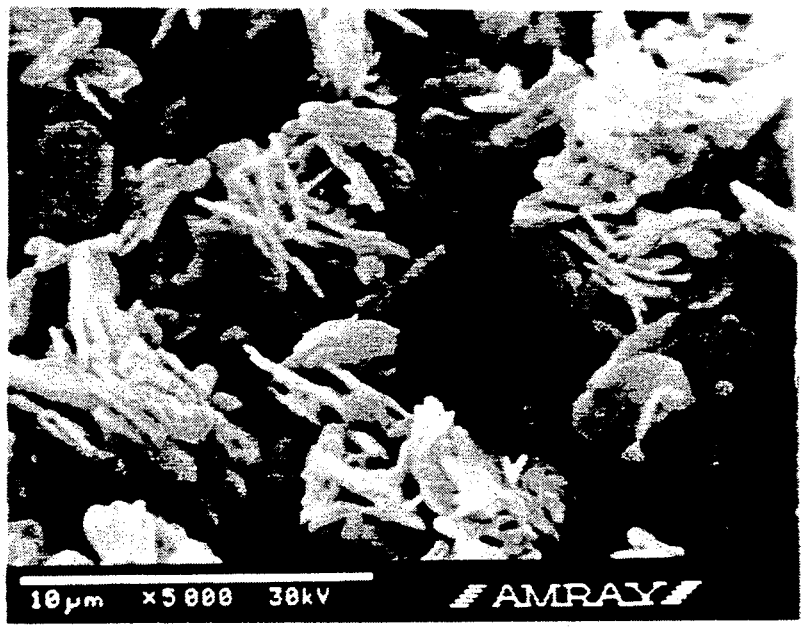
Figure 6B:

FIG 6(a-b) SEM micrographs of PbO derived from the calcination of lead oxalate for 1 hr at a) 400° C. and b) 600° C.

Figure 7:
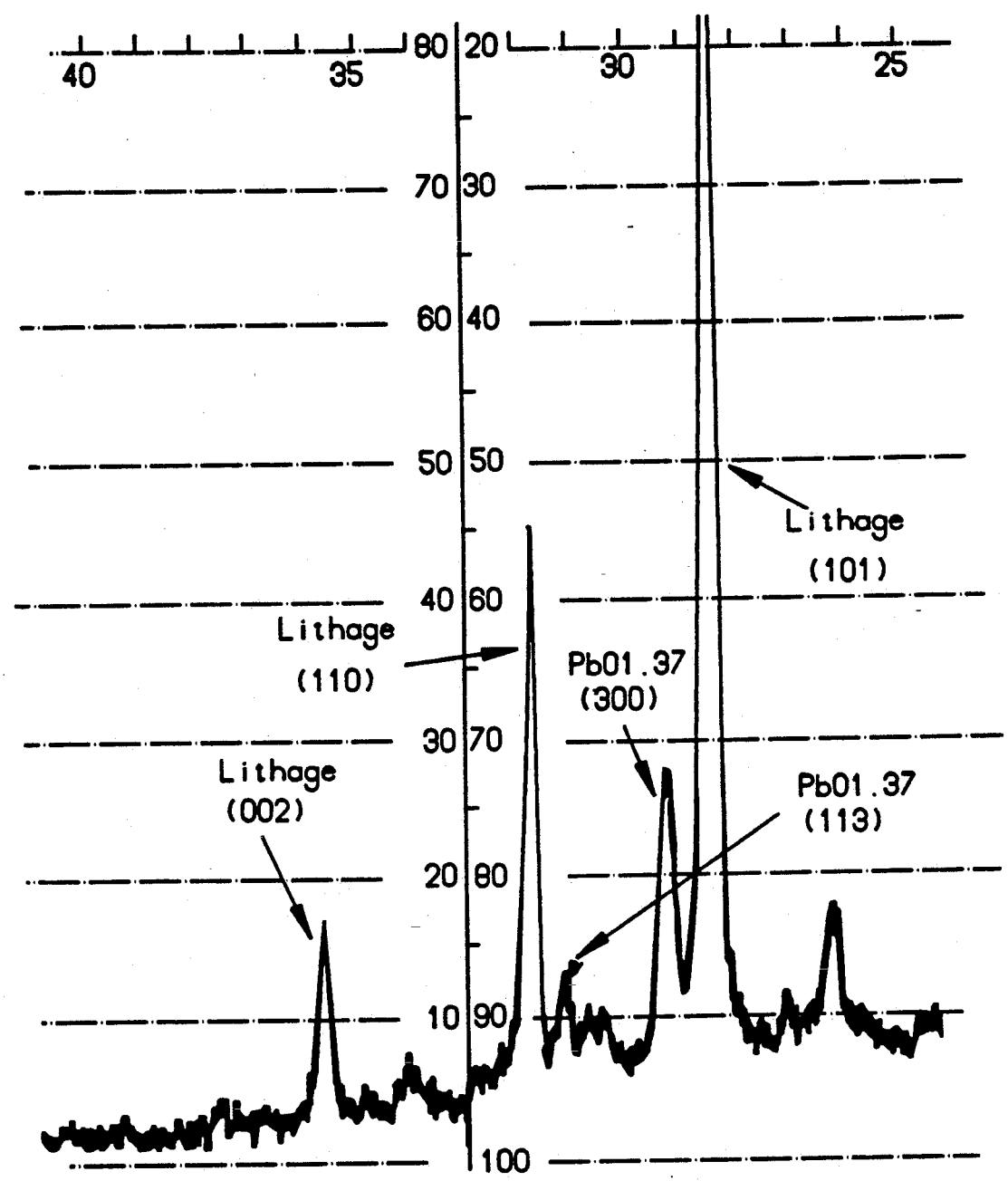
Figure 8A:
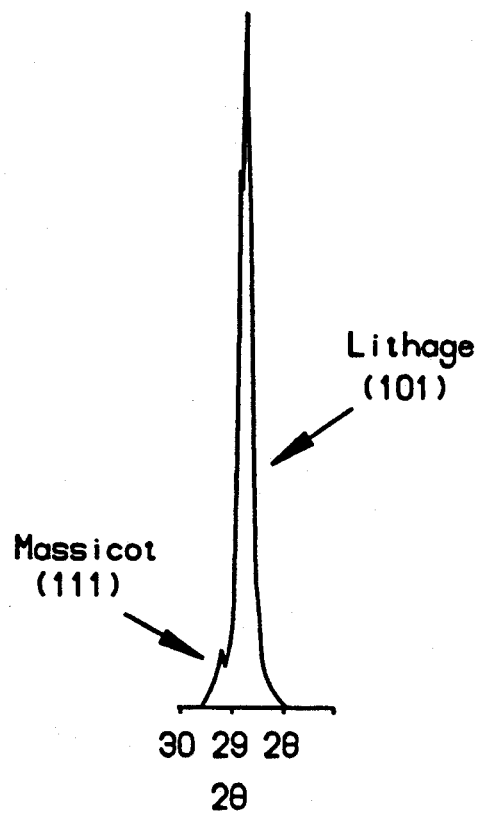
Figure 8B:
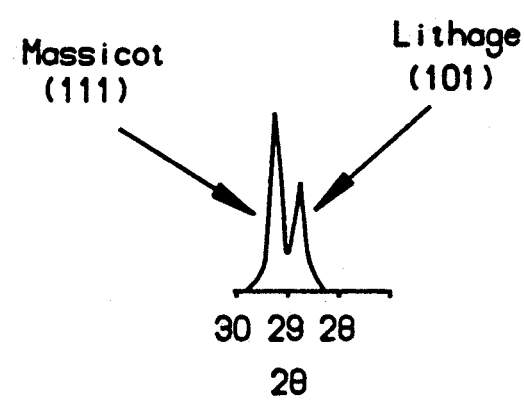
Figure 8C:
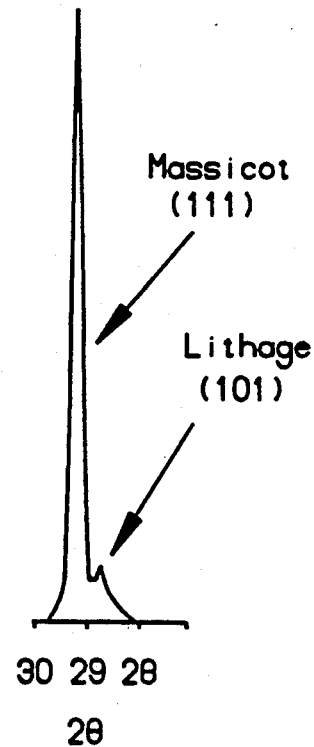
Figure 8D:
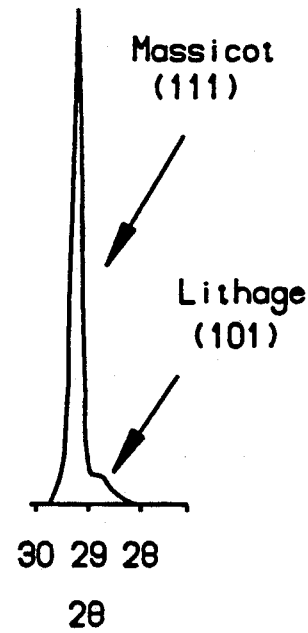

FIG. 7 XRD analysis of PbO derived by calcining $PbC_2O_4$ at 400° C. for 1 hr in static air.

FIG. 8(a-d) XRD analyses of PbO derived by calcining $PbC_2O_4$ at 600° C. for a) 1, b) 10, c) 30, and d) 60 min.

Figure 9:
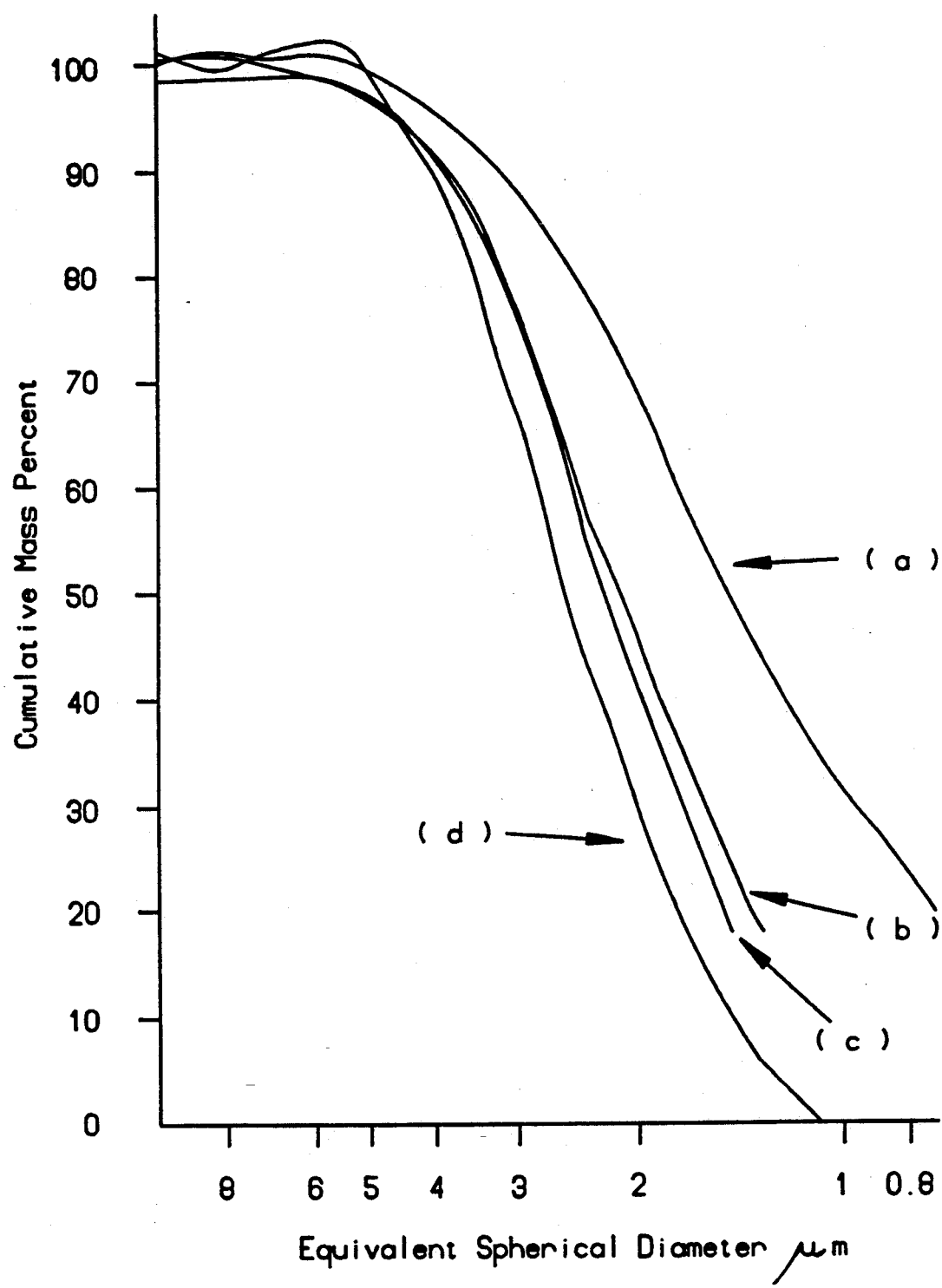
Figure 10A:
Figure 10B:
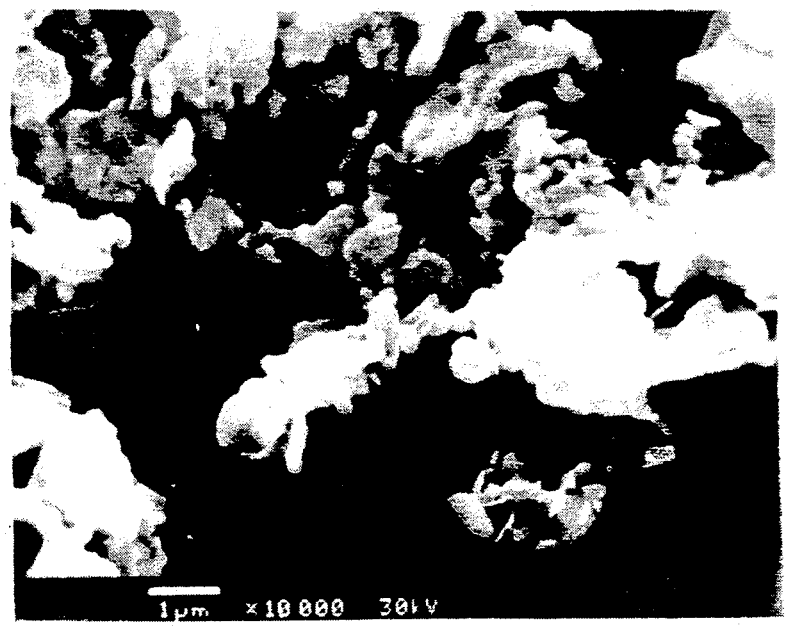
Figure 10C:
Figure 10D:
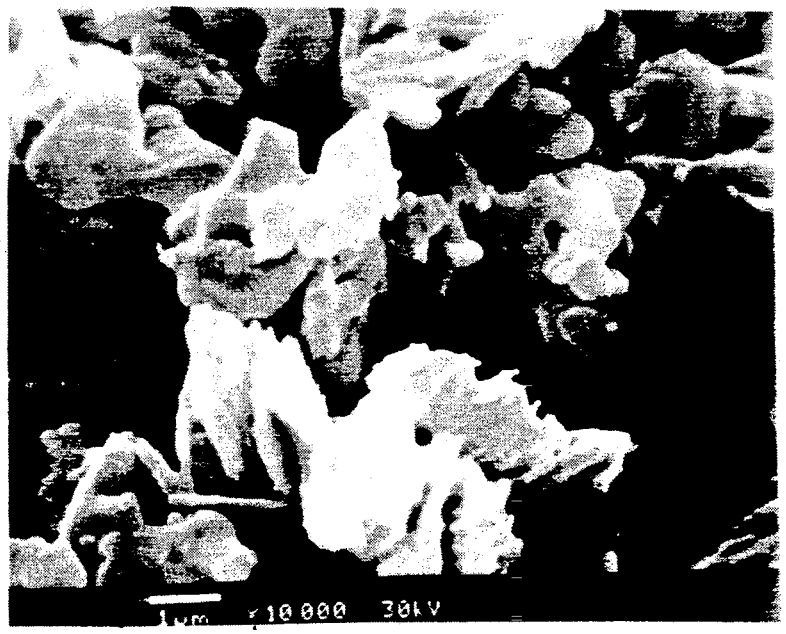

FIG. 9 Photosedimentation particle size analysis of PbO derived by calcining $PbC_2O_4$ at 600° C. for a) 1, b) 10, ,c) 30, and d) 60 min.

FIG. 10(a-d) SEM micrographs of PbO derived by calcining $PbC_2O_4$ at 550° C. for a) 1, b) 10, c) 30, and d) 60 min.

6. DETAILED DESCRIPTION OF THE INVENTION

The present invention provides a process for making lead monoxide precursors having a particular morphology which can then be converted, using a second process of the present invention, to a free flowing lead monoxide powder having a number of desirable characteristics including, but not limited to, a lack of extensive aggregation commonly observed during the calcination process of metal oxide precursors to their corresponding metal oxides, a plate-like morphology which renders mixtures containing the lead monoxide powder highly workable (plastic) and which is especially desirable in lubricant or coatings applications, and surprising crystal phase stability in which the massicot form retains its phase homogeneity over long periods of time under ambient storage conditions or even under continuous exposure, for up to 3 months, to ultraviolet light. Powders in which the crystal phase of the lead monoxide is distributed between litharge and massicot can also be prepared by the methods of the present invention. The relative proportions of either crystal form in these biphasic powders also remain unchanged under the conditions described above for the phase homogeneous preparations. The methods and compositions of the present invention are described in greater detail below.

6.1. OXALATE POWDER PRECIPITATION

Lead oxalate is synthesized using a modified PFHS technique, as described previously and in the examples section of the disclosure below. The reactions taking place in the system are given below.

$$MX = M^{2+} + X^{2-} \tag{4}$$

$$2H_2O + Et_2C_2O_4 = 2H^+ + C_2O_4^{2-} + 2EtOH \tag{5}$$

$$M^{2+} + C_2O_4^{2-} = MC_2O_4 \tag{6}$$

The total volume of the initial solutions are varied from 400 to 1800 mL in glass beakers on a hot/stir plate. Nitrates, sulfates, and chlorides are used as cation sources in addition to lead acetate. The precipitations are carried out in 85 vol % glacial acetic acid medium with a diethyl oxalate concentration of 0.365M. The salt chosen as the cation source is first dissolved in an amount of distilled-deionized water corresponding to 11 vol % of the total reaction volume. In a separate beaker, the diethyl oxalate is mixed with the acetic acid. The acetic acid-diethyl oxalate solution is then added to the metal cation solution with no precipitation occurring. Subsequent heating leads to hydrolysis of the diethyl oxalate and precipitation of the oxalate precursor. The $Pb^{2+}$ concentration is maintained between 0.03 to about 0.2M for all precipitations. Lead acetate is used as the cation source. The lead oxalate solutions are aged at 90° C. for 1 hr after initial precipitation is observed.

To study the effect of aging temperature on the particle morphology of lead oxalate, solutions 0.03M in $Pb^{2+}$ are aged at temperatures between 60° and 100° C. for 1 hr utilizing the previously described precipitation technique. The solutions are maintained on a hot/stir plate while monitoring the temperature with a thermometer. The effect of ammonium acetate, at a concentration of 0.130M, on the precipitation of lead oxalate aged at 70° C. for 1 hr is also studied. The solutions are 0.03M in $Pb^{2+}$ using $Pb(CH_3COO)_2$ as the cation source.

All precipitates are recovered by centrifugation. The precipitates are subsequently washed twice with distilled-deionized (DD) water, centrifuging after each wash. The final wash is carried out in acetone. The precursors are then dried at 90° C. in ambient air. The percent of theoretical powder yield for each process is determined based on the initial cation concentration.

6.2. PRECURSOR POWDER CHARACTERIZATION

The particle size and morphology of the precursor powders is revealed under the view of a scanning electron microscope (SEM, Amray Models 1200 and 1400, Brockton, Mass.). The samples are sputter-coated with a conductive layer of gold. An equivalent spherical diameter (ESD) for lead oxalate is determined by X-ray photosedimentation analysis on a sedigraph (Micromeritics, Model 5000D, Norcross, Ga.). Due to the poor dispersing characteristics and rapid settling of the lead powders in water, the analyses are performed in n-butanol. The powder is dispersed by treatment of the solution on an ultrasonic probe (Heat Systems-Ultrasonics, Inc., Farmingdale, N.Y.) for 1 min at 50 W power output. The temperature of the dispersions varies from 28° to 30° C. when analyzed. This difference in temperature and thus the viscosity of the liquid is taken into account when determining the cell scan rate for the analysis. Samples are submitted for carbon-hydrogen-nitrogen (CHN) combustion analysis (Onieda Research Services, Whitesboro, N.Y.) to substantiate the formation of pure oxalate salts. The crystalline nature of the precursors are studied by X-ray diffraction methods using a powder X-ray diffractometer (Philips, Mount Vernon, N.Y.). Ni-filtered Cu Kα radiation is employed at a scan rate of 1 degree per min.

6.3. RESULTS OF OXALATE PRECIPITATION

A tabulated summary of the precipitation conditions and particle characteristics for the precursor oxalates is given in Table I. An SEM micrograph of the precursor lead oxalate prepared by the method described above at cation concentrations of 0.03M and aged at 90° C. is given in FIG. 1. Precipitate formation become visible at approximately 80° C., with the solution becoming completely opaque after about 5 min. The salt chosen as the cation source has no effect on particle morphology or size. The yield of lead oxalate is found to vary from about 70 to about 80% of the theoretical yield. A longer aging time may produce a higher cation yield.

TABLE I

PRECIPITATION CONDITIONS AND PARTICLE CHARACTERISTICS FOR LEAD OXALATES

| Entry | Temp (°C.) | $[M^{2+}]$ (M) | $[NH_4^+OAc^-]$ (M) | $[C_2O_4^{2-}]$ (M) | Rxn Time (hr) | Size (microns) |
|---|---|---|---|---|---|---|
| 1 | 70 | 0.03 | 0.130 | 0.365 | 1 | $2^a$ |
| 2 | 70 | 0.03 | — | 0.365 | 1 | $2^b$ |
| 3 | 90 | 0.2 | — | 0.365 | 1 | $2^c$ |
| 4 | 90 | 0.03 | — | 0.365 | 1 | $2^c$ |

$^a$Agglomerated spheres
$^b$Spheres
$^c$Hexagonal plates

Sedigraph particle size analysis of the lead oxalate plates gives an average ESD of about 1.1 microns. Generally, the particles, whether they be spherical shaped or hexagonal plates can be prepared in different sizes. Particles as small as about 0.1 to as large as about 10 microns can be obtained. Preferably, the average particle size ranges from about 0.1 to about 5 microns, most preferably, between about 1 to about 3 microns. Since the shape of the particles is not ideal for X-ray photosedimentation analysis, this value is only an estimate. Nevertheless, size comparisons with other similarly shaped particles, such as the derived oxides, are valid comparisons. XRD analysis of the lead oxalate shows the sample to be crystalline (FIG. 2).

When using $Pb(CH_3COO)_2$ as the $Pb^{2+}$ source, increasing the cation concentration to 0.2M does not change the morphology or size of the particles precipitated. The investigation of higher cation concentrations is difficult because of the limits imposed by the solubility of lead acetate.

Figure 3B:
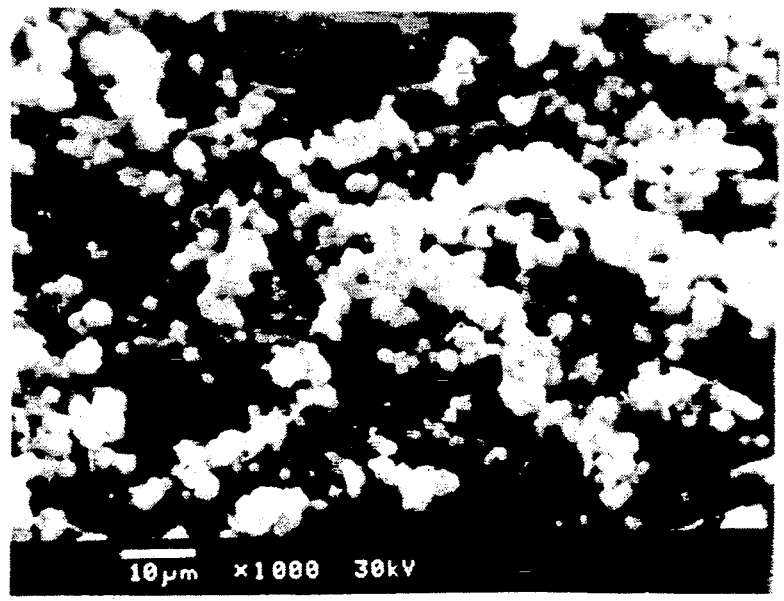

The temperature dependence of the precipitation of lead oxalate is studied by aging precipitating solutions at 90°, 80°, 70° and 60° C. The effect of aging the precipitates at 70° C. is shown in FIG. 3. When aged below about 70° C., the lead oxalate assumes a spherical morphology with a diameter on the order of 2 microns. FIG. 3(b) provides evidence that the presence of ammonium acetate increases the degree of aggregation and possibly the particle size of the powders precipitated at this temperature. However, the ammonium acetate does not affect the morphology of the precipitate. Transmission electron microscopy (TEM) diffraction data obtained from a sample of the spherical powder indicates that it is amorphous. By contrast, the powder aged at the higher temperature is crystalline in nature. The theoretical yield of the precipitates decreases as the aging temperature decreases (about 75% at 90° C. and about 20% at 60° C.), at a constant aging time of 1 hr. This lower yield is expected because of the slower growth rates at the lower temperatures. Increasing the aging time to increase the yield above about 75% may be effective.

Table II provides the results of the CHN combustion analysis performed on the precursor. A sample of lead oxalate aged at 90° C. is analyzed. As can be seen, the result compares very well with the theoretical values listed. The small amount of hydrogen found in the sample may be due to the presence of adsorbed acetic acid; the acetic acid may also contribute to the slight excess found for the carbon analysis. These results show that the precipitation process employed produces chemically well defined lead oxalate powders.

TABLE II

RESULTS OF LEAD OXALATE CHN COMBUSTION ANALYSIS

| Precursor | Experimental (wt %) | | | Theoretical (wt %) | | |
|---|---|---|---|---|---|---|
| | C | H | N | C | H | N |
| Lead plates | — 8.21 | — 0.01 | — 0.0 | 8.13 — | — — | 0.0 — |

Hence, colloidal lead oxalate in the form of irregularly shaped plates (average ESD about 1.1 microns) can be synthesized by the hydrolysis of diethyl oxalate in 85 vol % acetic acid medium. This plate morphology can be maintained at $Pb^{2+}$ concentrations of up to 0.2M. Although the present embodiments involve the synthesis of lead oxalate, it is apparent that the present modified technique can be applicable to precipitate other oxalate precursors. The present methods also demonstrate that a reduction in the aging temperature of the $PbC_2O_4$ from 90° to 70° C., results in a change in the morphology of the particles; that is, the platelet crystals appear more spherical, at a $Pb^{2+}$ concentration of 0.03M, when the lower aging temperature is employed.

6.4. OXALATE POWDER CALCINATION

Samples of the oxides are obtained by calcining the oxalates in a box furnace (Lindberg, Watertown, Wis.) at 600° C. for 2 hrs in a static air atmosphere. The temperature is monitored using a Pt/Pt 10% Rh thermocouple (Omega Engineering, Inc., Stamford, Conn.). Oxide samples are characterized by X-ray diffraction methods, SEM, and CHN combustion analysis in the same manner as the precursors described previously.

The weight loss of the oxalates is studied using a Model 7 TGA and Model 1700 DTA (Perkin Elmer, Norwalk, Conn.). The oxalates are analyzed in flowing (50 mL/min) air and $N_2$ atmospheres. Both gases are used as received from the manufacturer without further purification. The $N_2$ is reported as containing 10.5 ppm $H_2O$ while no specifications are available for the air. Samples of approximately 50 mg are heated at 10° C./min from room temperature to 600° C. Alumina is used as the reference material for the DTA analysis.

6.5. CHARACTERIZATION OF THE PbO PHASE TRANSFORMATION

Samples of $PbC_2O_4$ are fired in flowing air atmospheres to temperatures of 525°, 550° and 600° C. for soak times of 1, 10, 30 and 60 min. This procedure provides samples containing varying amounts of the two phases. The weight percent of each phase in the samples is determined by X-ray diffraction methods in which the peak heights are standardized using known amounts of pure samples. Because the two phases are of similar crystallite size and density (litharge=9.35 g/cm³ and massicot=9.7 g/cm³), the ratio of the height of the two strongest reflections for each phase (litharge, (101) diffraction plane at 28.7° $2\theta$ and massicot, (111) diffraction plane at 29.2° $2\theta$) can be used as a measure of phase concentration. The samples are also analyzed by SEM and X-ray photosedimentation particle size analysis. For particle size analysis, the samples are dispersed in n-butanol, as previously described.

To gain a further understanding of the chemical nature of the phase transformation, a sample of litharge, obtained by calcining the oxalate, is analyzed by a Model 7 differential scanning calorimeter (DSC). The litharge sample is sealed in an aluminum pan by crimping the sides of the pan onto a lid. The seal does not prevent gases from entering or escaping the sample environment, but does not permit control over the flowing atmosphere. The sample is heated at about 10° C./min from room temperature to about 350° C. and at a rate of about 1° C./min from 350° to 600° C. No atmosphere control is possible with the available apparatus. Zirconia (Fisher Scientific, Springfield, N.J.) is used as the reference material.

A simultaneous TGA-DTA run is performed using the Model 409 thermal analyzer (Netzsch, Exton, Pa.). Samples of pure litharge are analyzed in flowing (50 mL/min) atmospheres of air and $N_2$ using alumina as the reference material. A heating rate of about 1° C./min up to about 600° C. is employed. X-ray diffraction methods are used to determine the composition of the samples after calcination.

In an attempt to isolate $Pb_3O_4$ as an intermediate in the transformation, samples of litharge are isothermally heated at about 500° C. for 24 hrs in flowing $N_2$ and air atmospheres. The samples are analyzed in the TGA to monitor the weight loss. The fired samples are analyzed using X-ray diffraction methods.

Decomposition and phase development during calcination of lead oxalate can be studied by observing the changes in a sample of lead oxalate which is heated to various temperatures between 380° and 650° C. for given periods of time. The calcinations are carried out in a box furnace in static air. The oxalate is first calcined at 380° C. for 4 hrs. A sample of the oxide is then removed from the crucible and the remainder is calcined at 440° C. for 4 hrs. After a sample from this calcination temperature is secured, the powder is then calcined at 650° C. for 45 min. Similarly, a sample of this oxide is set aside, and the powder is then calcined at 650° C. for 4 hrs. All the samples, along with the final calcined oxide, are analyzed using X-ray diffraction methods to determine the intermediate phases associated with the phase transformation.

6.6. RESULTS OF TGA AND DTA ANALYSES OF THE PRECURSOR OXALATES

The TGA results for the decomposition of lead oxalate in air and $N_2$ are given in FIG. 4. Decomposition begins near 290° C. and is complete at about 340° C. and 370° C. for air and $N_2$ atmospheres, respectively. The two atmospheres provide different values for the LOI (theoretical values, $N_2$ 26.2 wt % and air 24.4 wt %) due to different reaction mechanisms. The observed LOI values of 26.3 wt % ($N_2$) and 24.4 wt % (air) compare well with the theoretical expectations. Elemental lead can be observed visually as small silver balls in the samples fired in the $N_2$ atmosphere. The lead tends to form globules when cooled which do not coat the powder. However, formation of this liquid phase during calcination can lead to the formation of hard agglomerates when the powder is cooled. The observed change in the slope of the lead oxalate decomposition curve may result from the deposition of carbon, characteristic of the Boudouard reaction.

$$2CO = C(s) + CO_2 \quad (7)$$

The DTA results for the lead oxalate are shown on FIG. 5. In air, oxidation of CO dominates the results initially and continues nearly to the end of the decomposition. In nitrogen, the decomposition appears to proceed in two endothermic stages. The largest initial peak corresponds to the decomposition of the oxalate, while the second peak may be attributed to either the melting of elemental lead or the reduction process which forms the lead. The reaction temperatures indicated by DTA are about 30° C. higher than those observed by TGA.

6.7. CHARACTERIZATION OF THE OXIDES

SEM micrographs of the lead monoxide obtained from calcining the oxalates are given in FIG. 6. It is found that PbO maintains the morphology of its lead oxalate precursor at lower calcination temperatures (less than about 500° C.). When calcined at higher temperatures (about 600° C.) for 1 hr in air or $N_2$, the plate-like morphology of the precursor particles are altered somewhat and a slight amount of aggregation is observed. Calcining lead oxalate above 500° C. thus causes some aggregation of the particles. CHN combustion analysis of the PbO samples showed residual carbon levels of less than about 0.1 wt %. For most applications, a residual carbon content of about 0.01 to about 0.5 wt % should not be detrimental.

The crystal phase of PbO samples is found to depend on the calcination temperature, soak time, and firing environment. Samples calcined in a box furnace under ambient atmospheric conditions are analyzed along with samples fired in flowing air in the TGA. The LOI of all samples is monitored to determine if free Pb is forming and if complete decomposition of the oxalate has occurred. Samples fired at 400° C. for 1 hr in the box furnace are found to be a mixture of litharge and a minor amount of $PbO_{1.37}$ (FIG. 7), which has a lead:oxyqen ratio very similar to the compound $Pb_3O_4$. Samples fired in the TGA under similar thermal conditions are found to be pure litharge. The formation of $Pb_3O_4$ may be a consequence of the fact the samples fired in a crucible in the box furnace have more surface area available for oxidation than the litharge in the TGA sample pan. Samples from the TGA and box furnace calcined at 600° C. for 1 hr are found to be 100% massicot. Samples prepared by firing at temperatures between 500° and 600° C. are found to be a mixture of litharge and massicot. Thus, depending on the conditions employed, lead monoxide powders having virtually any distribution of litharge and massicot forms can be obtained. In particular embodiments of the present invention, samples which are 100 percent by weight litharge, 100 percent by weight massicot or samples in which the lead monoxide crystal phase is proportioned between about 2 to about 98 percent by weight litharge and about 98 to about 2 percent by weight massicot are prepared.

6.8. EFFECT OF THE PbO PHASE TRANSFORMATION ON PARTICLE AGGREGATION

The present inventors have discovered that a more quantitative measure of the relationship between the degree of aggregation observed and the relative amounts of the two lead monoxide crystal phases present in the powder can be obtained by performing the calcinations in the temperature range of about 500° to about 600° C., where it is known that transformation occurs. FIG. 8 shows the XRD results for lead oxalate samples fired at 600° C. for 1, 10, 30 and 60 min, respectively. A comparison of the strongest reflections for the two polymorphs is presented. It can be seen that as the soak time increases, the amount of massicot increases until, at a soak time of 60 min, 100% massicot is obtained. The sedigraph analysis results for the same samples are given in FIG. 9. These results show that the average ESD of the samples increases with increasing amounts of massicot. Table III summarizes the XRD and sedigraph analysis results for all the samples analyzed. FIG. 10 presents a series of micrographs from the samples fired at 550° C. It can be seen from the micrographs and the results in the Table that the particle morphology does not change substantially with soak time. However, a slight coarsening is observed with increasing lengths of soak time although the particulate nature of the powder remains unaffected.

TABLE III

| X-RAY DIFFRACTION PHASE ANALYSIS AND SEDIGRAPH PARTICLE SIZE ANALYSIS OF CALCINED LEAD MONOXIDE[a] | | | | |
|---|---|---|---|---|
| Oven Temp (°C.) | Soak Time (min) | Litharge (wt %) | Massicot (wt %) | Ave ESD (microns) |
| 525 | 1 | 100.00 | 0.00 | 1.15 |
|  | 10 | 84.90 | 15.10 | 1.35 |
|  | 30 | 68.80 | 31.20 | 1.50 |
|  | 60 | 75.60 | 42.40 | 1.80 |
| 550 | 1 | 92.10 | 7.87 | 1.34 |
|  | 10 | 83.00 | 17.00 | 1.73 |
|  | 30 | 56.50 | 43.50 | 1.98 |
|  | 60 | 47.10 | 52.90 | 2.15 |
| 600 | 1 | 90.50 | 9.52 | 1.43 |
|  | 10 | 37.60 | 62.40 | 2.08 |
|  | 30 | 9.26 | 90.70 | 2.20 |
|  | 60 | 0.00 | 100.00 | 2.49 |

[a]The starting material in all cases is lead oxalate having a plate-like morphology and average ESD of 1.09 microns.

In an effort to determine the reproducibility of the observed results, samples of oxalate from a different lot of precipitated $PbC_2O_4$ are fired in identical fashion. In this case, only the samples fired at 600° C. show any evidence of transformation, as determined by XRD. In addition, SEM and sedigraph analysis confirm that no aggregation occurs when the phase transformation is absent. Thus, even though there had been an apparent upward shift in the phase transition temperature of the second set of powder samples, the premise that some coarsening accompanies calcination carried out at or close to the phase transformation in lead monoxide powders holds. Furthermore, any coarsening can be avoided altogether by heating the lead oxide precursors at a temperature which is sufficient to convert them to the oxides but which temperature is below the phase transition temperature.

X-ray fluorescence methods, sensitive to fluorescent species present at a concentration of about 100 ppm are greater, does not detect any contaminants in the precursor used in the second set of experiments, which impurities may affect the transformation temperature. Also, the precursor particles are not of a different size or morphology than those of the first study. However, the possibility cannot-be discounted that contamination on the ppm level can be causing the observed shift in transition temperature. An additional factor which can affect the transformation temperature is the relative humidity during the calcination process. The amount of water present has been shown to affect the litharge-massicot equilibrium.

From these results alone, it is tempting to conclude that the phase transformation alone is responsible for the observed amount of particle aggregation. However, because the melting temperature of PbO is relatively low (890° C.), it is possible that other mechanisms can be contributing to the initial stage sintering (ISS). Nevertheless, it is believed that the reconstructive phase transformation is the dominant mechanism which controls the slight aggregation observed.

Furthermore, the chemical species involved in the transition from litharge to massicot is slightly more complicated that what had been perceived. In particular, the mechanism of transformation appears to differ in air relative a nitrogen atmosphere. The present inventors have found that after oxidation of the litharge PbO to $Pb_3O_4$ in air, the $Pb_3O_4$ reduces back to litharge at a temperature of about 560° C. The reconstructive transformation to massicot then takes place after this reduction. Because a sample heated at 650° C. in nitrogen shows a greater degree of massicot formation than a sample heated at the same temperature in air, it can be said that the intermediary oxidation of litharge to $Pb_3O_4$ and the subsequent reduction back to litharge indirectly slows the formation of massicot. These results indicate that the transformation is truly reconstructive and not an redox transformation mechanism as has been stated in the published literature (Nordyke. J. S. "Lead in the World of Ceramics," The American Chemical Society, Columbus, Ohio (1984) p. 5). A schematic representation of the transformation mechanisms observed in this work, in $N_2$ and air atmospheres, is given below.

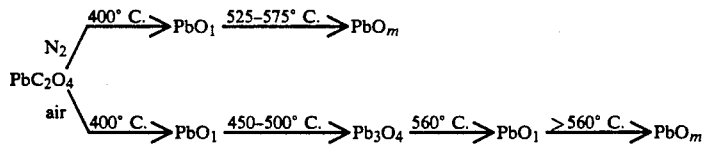

Hence, nonaggregated PbO can be prepared by calcining the oxalate precursor at temperatures below 500° C. At calcination temperatures greater than 500° C. some aggregation is observed although the powder retains its particulate dimensions and a some degree of the precursor's plate-like morphology. An increase in the temperature of transformation noted in some samples is accompanied by an equivalent increase in the aggregation temperature. It has also been shown that the oxidation of litharge to $Pb_3O_4$ occurs only in flowing air atmospheres. Direct transformation to massicot occurs during calcination in static air or nitrogen atmospheres. Thus, the litharge to massicot phase transformation is truly reconstructive, with intermediate species such as $Pb_3O_4$ playing no direct role in the formation of massicot.

It should be apparent to one of ordinary skill that the discoveries disclosed in the present invention can be applied to calcination processes involving multiple metal species. In particular, the lead oxalate precursor, whose preparation is described herein, may be heated in the presence of other types of precursors including precursors for other metal oxides or other precursors for lead monoxide (e.g., lead sulfate, lead acetate and the like). It should be equally apparent that the present lead monoxide powder can also be heated with other metallic components to avoid or exploit the onset of the litharge to massicot phase transformation. Nonaggregated species can likely be obtained at temperatures below the phase transition whereas coarser materials may result at higher temperatures.

6.9. PHASE STABILITY OF THE PbO POWDERS

The phase stability of the present lead monoxide powders is established by examining samples of each of the lead monoxide preparations described which are stored at ambient temperature, pressure and humidity conditions at various time intervals. In particular, samples are examined at time intervals of 6, 12, 18, 24 and 30 months. Each of the samples are analyzed using a powder X-ray diffractometer. Examination of the resulting powder diffraction patterns reveals that the samples exhibit substantially no change in their respective diffraction patterns over the storage periods of interest. This phase stability extends to the phase homogeneous powders, particularly the 100% massicot lead monoxide or to those prepared as mixtures of the litharge and massicot forms.

Moreover, samples of the present lead monoxide powders which are exposed continuously to ultraviolet radiation, exposure which would be sufficient to convert ordinary previously known lead monoxide compositions to the litharge form, remain substantially unchanged over the extended uv exposure. Samples are exposed continuously for up to 3 months to a uv source, typically a hand-held uv lamp.

6.10. COMPOSITIONS HAVING PLASTICITY

When the lead oxalates or lead monoxides of the present invention are combined with a suitable liquid component, the liquid forms a film between the plate-like particles of the crystalline lead powder, allowing the individual plates to slide freely yet form an integral network of interconnected plates. Such a condition forms the basis by which compositions comprising the present lead monoxides or lead oxalates and the suitable liquid component possess plastic or workable characteristics which are desirable from a processing point of view. These compositions can be molded, shaped, stamped, extruded or preformed prior being introduced to the next manufacturing step, e.g., calcination, firing or sintering, to produce the final product, e.g, an electronics component.

It should be apparent to those of ordinary skill that such compositions can be prepared with numerous liquids. However, the chosen liquids are preferably volatile, low boiling organic solvents which can be easily removed once their role of wetting the platelets has been fulfilled. Examples of suitable liquids include, but are not limited to, aliphatic hydrocarbons having 1-8 carbon atoms, alcohols with 1-3 carbon atoms or aromatic hydrocarbons having 6-7 carbon atoms. In particular, lower alkyl alcohols such as methanol, ethanol, n-propanol or isopropanol are preferred. Furthermore, these organic solvents may be substituted with up to about 4 halogen atoms including fluorine, chlorine or bromine. Iodine substituents may also be used in some cases but may pose difficulty in others because of its reducing nature and high molecular weight. Pure water or aqueous solvent mixtures, including buffers, may also be employed as the liquid component. The preceding liquid components may be used singly or in combination with other suitable liquids.

Preferably, the lead monoxide powder is substantially, almost exclusively, plate-like in morphology and has a suitable colloidal particle size distribution. Suitable particle sizes may range from about 0.1 to as large as about 10 microns. In certain cases, the particle size distribution may be fairly narrow, with average ESDs of about 0.1 to about 3 microns. However, powders comprised exclusively or partly of the lead monoxide may have a proportion of colloidal particles as low as about 10 percent by weight of the powder and still provide superior plasticity to the moist composition. Likewise, the amount of the powder used relative to the liquid component may be varied widely. Typically, the suitable liquid component may comprise from about 10 to about 50 percent by volume of the composition. Preferably, the liquid is present at a level of about 30-40 percent by volume and the balance being made up of the present plate-like colloidal lead powders.

In a related application of the present colloidal lead monoxide and lead oxalate powders, solid lubricants may also be prepared according to methods well known in the art. Such solid lubricants can also be applied as coatings, especially for high temperature applications. For instance, it is known that layers lead monoxide or a suitable precursor can be established on the surface of metal molds used for the manufacture of glass vessels. Thus, a superior method for lubricating high temperature surfaces can also be contemplated utilizing the plate-like lead powders of the present invention.

7. EXAMPLES

As a further illustration of the present methods, the following examples are described. The particle size and morphology of the as precipitated precursors (oxalate) and calcined (oxide) powders are characterized using an Amray (Brockton, Mass.) Model 1200 scanning electron microscope (SEM). A Micromeritics (Norcross, Ga.) Sedigraph Model 5000 D particle size analyzer is also used to determine the average equivalent spherical diameter (ESD) of the powder samples dispersed in n-butanol. Thermal gravimetric analysis (TGA) is performed on the metal oxalates using a Perkin-Elmer (Norwalk, Conn.) Model 7 TGA. The TGA heating rate is 10° C./min, and samples are analyzed once in dry air and again under a dry $N_2$ atmosphere. Carbon-hydrogen-nitrogen (CHN) chemical analyses is performed on the dried precursors and oxides (Oneida Research Services, Whitesboro, N.Y.).

7.1. PREPARATION OF METAL OXALATE PRECURSORS

Lead oxalate is prepared by a PFHS method based on work described by Gordon, L. et al. in "Precipitation From Homogeneous Solution," John Wiley and Sons, New York, N.Y. (1959) pp. 61-62. A solution containing 0.025-0.2M $Pb^{2+}$ (obtained from Fisher Chemical, Fairlawn, N.J.) and 0.365M diethyl oxalate (purchased from Eastman Kodak Company, Rochester, N.Y.) in 85 percent by volume acetic acid (obtained from Corco Chemical Corporation, Fairless Hills, Pa.) is prepared and heated to 90° C. with stirring. After about 3 minutes, a precipitate comprising the metal oxalate dihydrate is observed, and, thereafter, the mixture is allowed to age at 90° C. for about 1 hour. The precipitate (precursor) is collected by centrifugation, washed twice with distilled deionized water and washed once with acetone. The metal oxalate salts are dried in air at 90° C. Variations in the precipitation conditions can be made as illustrated by the results of Table I.

7.2. CALCINATION TO LEAD OXIDE POWDERS

To study the reconstructive litharge to massicot phase transformation of lead oxide (PbO), samples of $PbC_2O_4$ are fired to temperatures of 525°, 550° and 600° C. in air for soak times of 1, 10, 30 and 60 minutes. Under these conditions, samples of varying concentration for each phase are obtained. The weight percent of each phase present is determined using an X-ray diffractometer employing Ni-filtered Cu K-alpha radiation. Because the two phases are of similar crystallite size and density, the ratio of the height of the two strongest diffraction peaks for each phase (litharge, (101) diffraction plane at 28.7° $2\phi$ and massicot, (111) diffraction plane at 29.2° $2\phi$) can be used as a measure of phase concentration. The reader is referred to the entries of Table III for a concise listing of the observed results.

7.3 PREPARATION OF WORKABLE COMPOSITIONS

An extrudable lead oxide-based ceramic composition free of organic processing additives can be prepared when plate-like PbO is employed. To prepare lead titanate, a mixture of 26.4 g wt % titania (rutile), 73.6 g PbO (litharge) and 15 mL water (50 vol % solids) is prepared. The above mixture can be utilized for auger or piston extrusion to form various shapes. Such shapes can be reactive-solid state sintered without the need for a binder burnout process. Alternatively, the shapes can be calcined and milled to form a powder useful for other forming processes such as tape casting, dry pressing, or hot pressing.

A plastic lead oxide ceramic composition free of organic processing additives can be prepared when plate-like PbO is employed. PbO (100 g) is mixed with 12.5 g of water with an intensive mixing device such as an Eirich mixer. Alternatively, organic solvents such as ethanol can be employed in a similar volume fraction.

Plastic compositions can be formulated with nonpolar organic solvents such as hexane and a suitable dispersant. For instant, 100 g of PbO is combined with 12.5 mL hexane containing 3 g OLOA 1200 ® (Chevron) using an intensive mixer.

7.4 PREPARATION OF LUBRICANT COMPOSITIONS AND COATINGS

Plate-like PbO can be used as a dry lubicant for high temperature applications. The plate-morphology provides lubrication in the same manner as graphite or boron nitride platelets. In contrast, PbO platelets are oxidation resistant and can be employed at temperatures approaching its melting point (890° C.). This suitability to high temperature applications can be exploited in a die lubricant for the hot pressing of ceramics, where minimal lead contamination can be tolerated, and lead-based ceramics (i.e., lead titanate, lead zirconate titanate and lead lanthanum zirconate titanate). In addition to its usefulness as an oxidation-resistant lubricant, it can provide PbO vapor which can inhibit the volatilization of PbO commonly encountered in lead oxide-based ceramics such as those cited above.

The fine PbO particle size is useful as a lubricating oil or grease. Conventional approaches can be used for preparing the lubricant. For instance, a lubricant grease can be prepared by mixing 25 wt % barium soaps of fatty acids ($C_{17-20}$), 14 wt % PbO, 5 wt % ZnO, 4 wt % barium soaps of caster oil fatty acids and 2 wt % barium naphthenate (See, for example, USSR Patent 730,795). Likewise, 30 wt % PbO, 16 wt % fish oil, 5 wt % vegetable fatty acids and 48 wt % crude motor oil can be combined to prepare a lubricant additive (See, for example, U.S. Pat. No. 3,702,822).

7.5 MISCELLANEOUS APPLICATIONS

Colloidal PbO in the massicot form can be used for semiconductor sensitization of photosensitive materials. PbO can be dispersed in silver halide emulsions (AgCl, AgBr) to produce a peak in the action spectra at 450 nm. Tetragonal lead oxide does not possess the necessary characteristics and thus cannot be used for this purpose. Hence, 1.04 g of massicot lead monoxide is added to a silver halide emulsion to reduce the silver concentration from 9.5 to 4.4 wt %. The resulting film is 3 steps faster than the conventional film containing the higher concentration of silver (See, for example, DE 2,157,834).

The preceding examples serve only to illustrate specific embodiments of the present invention and should not be construed as limiting the invention in any manner. Such limitations are defined solely by the following claims.

What is claimed is:

1. A phase homogeneous crystalline lead monoxide powder comprising substantially free flowing massicot lead monoxide having (i) a substantially plate-like morphology, and (ii) an average particle size of about 0.1 to about 10 microns in diameter as determined by photosedimentation methods, which lead monoxide retains its massicot crystalline form under ambient temperature, pressure and humidity conditions for a period of at least about 6 months as evidenced by the failure to detect any significant peaks attributable to the litharge crystalline form in the powder X-ray diffraction pattern obtained for a sample of said lead monoxide which had been stored under said conditions for said period, and which lead monoxide is chemically stable under the influence of constant exposure to ultraviolet radiation as evidenced by the substantial retention of the original color of a sample of said lead monoxide which had been exposed to a uv lamp for 3 months, said lead monoxide powder has been produced by heating lead oxalate having a plate-like morphology at a temperature ranging from about 400° C. to about 600° C. for a period of time sufficient to convert said lead oxalate to said lead monoxide.

2. The powder of claim 1 in which said lead monoxide contains a residual amount of carbon at a concentration of about 0.01 to about 0.5 percent by weight of said lead monoxide.

3. The powder of claim 1 in which said lead monoxide contains a residual amount of carbon at a concentration of about 0.1 percent by weight of said lead monoxide.

4. The powder of claim 1 in which said lead monoxide has a particle size ranging from about 1 to about 3 microns in diameter as determined by photosedimentation methods.

5. The powder of claim 1 in which said lead monoxide has an average particle size ranging from about 2 to about 3 microns in diameter as determined by photosedimentation methods.

6. A phase homogeneous crystalline lead monoxide powder comprising substantially pure free flowing massicot lead monoxide, which lead monoxide retains its massicot crystalline form under ambient temperature, pressure and humidity conditions for a period of at least about 24 months, or under continuous exposure to a source of ultraviolet radiation for a period of 3 months, as evidenced by the failure to detect any significant peaks attributable to the litharge crystalline form in the powder X-ray diffraction pattern obtained for a sample of said lead monoxide which had been stored under said ambient conditions for about 24 months, which lead monoxide can be further characterized as having a residual amount of carbon but is substantially free of heavy atom impurities and having a substantially plate-like morphology, an average particle size ranging from about 0.5 to about 5 microns in diameter as determined by photosedimentation methods, and containing a residual amount of carbon derived from an organic lead compound precursor, and which lead monoxide is chemically stable under the influence of constant exposure to ultraviolet radiation as evidenced by the substantial retention of the original color of a sample of said lead monoxide which had been exposed to a uv lamp for 3 months, said lead monoxide powder has been produced by heating lead oxalate having a plate-like morphology at a temperature ranging from about 400° C. to about 600° C. for a period of time sufficient to convert said lead oxalate to said lead monoxide.

7. A biphasic crystalline lead monoxide powder comprising substantially pure free flowing lead monoxide having (i) a substantially plate-like morphology, and (ii) an average particle size of about 0.1 to about 10 microns in diameter as determined by photosedimentation methods, the crystal phase of which is proportioned between preselected amounts of litharge and massicot, which proportion remains substantially unchanged under ambient temperature, pressure and humidity conditions for a period of at least about 6 months as evidenced by the failure to detect any significant change in the ratio of the height of the strongest peak attributable to the litharge crystalline form to the height of the strongest peak attributable to the massicot crystalline form in the powder X-ray diffraction pattern obtained for a sample of said biphasic lead monoxide, and which lead monoxide is chemically stable under the influence of constant exposure to ultraviolet radiation as evidenced by the substantial retention of the original color of a sample of said lead monoxide which had been exposed to a uv lamp for 3 months, said lead monoxide powder has been produced by heating lead oxalate having a plate-like morphology at a temperature ranging from about 400° C. to about 600° C. for a period of time sufficient to convert said lead oxalate to said lead monoxide.

8. The powder of claim 7 in which said lead monoxide contains a residual amount of carbon at a concentration of about 0.01 to about 0.5 percent by weight of said lead monoxide.

9. The powder of claim 7 in which said lead monoxide contains a residual amount of carbon at a concentration of about 0.1 percent by weight of said lead monoxide.

10. The powder of claim 7 in which the crystal phase of said lead monoxide is proportioned between about 2 to about 98 wt % litharge and about 98 to about 2 wt % massicot.

11. The powder of claim 7 in which the crystal phase of said lead monoxide is proportioned between about 30 to about 70 wt % litharge and about 70 to about 30 wt % massicot.

12. The powder of claim 7 in which the crystal phase of said lead monoxide is proportioned between about 50 wt % litharge and about 50 wt % massicot.

13. A crystalline lead monoxide powder comprising substantially pure free flowing lead monoxide having (i) a substantially plate-like morphology, and (ii) having an average particle size of about 0.1 to about 10 microns in diameter as determined by photosedimentation methods, effective to convey plasticity or workability to compositions comprising at least about 50 volume percent of said lead monoxide and up to about 50 volume percent of a suitable volatile liquid component, and which lead monoxide is chemically stable under the influence of constant exposure to ultraviolet radiation as evidenced by the substantial retention of the original color of a sample of said lead monoxide which had been exposed to a uv lamp for 3 months, said lead monoxide powder has been produced by heating lead oxalate having a plate-like morphology at a temperature ranging from about 400° C. to about 600° C. for a period of time sufficient to convert said lead oxalate to said lead monoxide.

14. The powder of claim 13 in which at least 10 percent by weight of said lead monoxide particles is colloidal.

15. The powder of claim 14 in which the particles that are colloidal have a particle size distribution ranging from about 0.1 to about 5 microns in diameter as determined by photosedimentation methods.

16. The powder of claim 13 in which the crystal phase of said lead monoxide is substantially homogeneous.

17. The powder of claim 16 in which said crystal phase is litharge.

18. The powder of claim 16 in which said crystal phase is massicot.

19. The powder of claim 13 in which the crystal phase of said lead monoxide is proportioned between litharge and massicot.

20. The powder of claim 13 in which the crystal phase of said lead monoxide is proportioned between about 10 to about 85 wt % litharge and about 90 to about 15 wt % massicot.

21. A lubricant comprising a sufficient amount of lead monoxide or a precursor thereof, which lead monoxide or precursor has (i) a substantially plate-like morphology, and (ii) an average particle size of about 0.5 to about 5 microns in diameter as determined by photosedimentation methods, and which lead monoxide is chemically stable under the influence of constant exposure to ultraviolet radiation as evidenced by the substantial retention of the original color of a sample of said lead monoxide which had been exposed to a uv lamp for 3 months, said lead monoxide powder has been produced by heating lead oxalate having a plate-like morphology at a temperature ranging from about 400° C. to about 600° C. for a period of time sufficient to convert said lead oxalate to said lead monoxide.

22. The lubricant of claim 21 in which said lead monoxide is substantially phase homogeneous.

23. The lubricant of claim 21 in which said lead monoxide is primarily in the litharge form.

24. The lubricant of claim 21 in which said lead monoxide is primarily in the massicot form.

25. The lubricant of claim 21 in which said lead monoxide is present as a mixture of the litharge and massicot forms.

26. The lubricant of claim 21 in which said lead monoxide has an average particle size of about 1 to about 3 microns in diameter as determined by photosedimentation methods.

* * * * *